(12) United States Patent
Wakamatsu et al.

(10) Patent No.: US 12,149,593 B2
(45) Date of Patent: Nov. 19, 2024

(54) COMMUNICATION APPARATUS, SERVER, COMMUNICATION SYSTEM, AND COMMUNICATION METHOD

(71) Applicant: DAIKIN INDUSTRIES, LTD., Osaka (JP)

(72) Inventors: Kosuke Wakamatsu, Osaka (JP); Fumikazu Yobimoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/554,714

(22) PCT Filed: Apr. 28, 2022

(86) PCT No.: PCT/JP2022/019346
§ 371 (c)(1),
(2) Date: Oct. 10, 2023

(87) PCT Pub. No.: WO2022/234821
PCT Pub. Date: Nov. 10, 2022

(65) Prior Publication Data
US 2024/0089330 A1   Mar. 14, 2024

(30) Foreign Application Priority Data
May 6, 2021   (JP) ................ 2021-078393

(51) Int. Cl.
 G06F 15/173   (2006.01)
 H04L 9/40   (2022.01)
 H04L 67/141   (2022.01)
(52) U.S. Cl.
 CPC ........... H04L 67/141 (2013.01); H04L 63/08 (2013.01)

(58) Field of Classification Search
 CPC .................................................. H04L 67/141
 See application file for complete search history.

(56) References Cited

U.S. PATENT DOCUMENTS

| 2014/0164106 A1 | 6/2014 | Naik et al. |
| 2014/0282481 A1 | 9/2014 | Ohara |
| 2018/0260172 A1* | 9/2018 | Nakamura .......... H04L 41/0806 |
| 2023/0131484 A1 | 4/2023 | Wakamatsu et al. |

FOREIGN PATENT DOCUMENTS

| JP | 2014-179021 | 9/2014 |
| JP | 2017-175227 | 9/2017 |
| JP | 2018-151768 | 9/2018 |
| JP | 2020-113868 | 7/2020 |
| JP | 6813110 | 1/2021 |

OTHER PUBLICATIONS

International Search Report for PCT/JP2022/019346 mailed on Jul. 19, 2022.
International Preliminary Report on Patentability for PCT/JP2022/019346 mailed on Nov. 16, 2023.

* cited by examiner

*Primary Examiner* — Padma Mundur
(74) *Attorney, Agent, or Firm* — IPUSA, PLLC

(57) ABSTRACT

In a communication apparatus communicating with a server based on connection information and firmware for connecting to the server, in order to appropriately communicate with various servers, the communication apparatus is configured to
 communicate with a first server based on first connection information and first firmware for connecting to the first server, and
 acquire, from the first server, second firmware for connecting to a second server different from the first server.

8 Claims, 17 Drawing Sheets

FIG.4A

| COMMUNICATION APPARATUS ID | IoT SERVER | EDGE ID | STATE |
|---|---|---|---|
| 123456 | | | INITIAL STATE |
| ... | ... | ... | ... |

| COMMUNICATION APPARATUS ID | IoT SERVER | EDGE ID | STATE |
|---|---|---|---|
| 123456 | IoT SERVER 20A | edge-20A-0001 | SECOND CONNECTION INFORMATION ISSUED |
| ... | ... | ... | ... |

| COMMUNICATION APPARATUS ID | IoT SERVER | EDGE ID | STATE |
|---|---|---|---|
| 123456 | IoT SERVER 20A | edge-20A-0001 | SECOND CONNECTION INFORMATION REPORTED |
| ... | ... | ... | ... |

| COMMUNICATION APPARATUS ID | IoT SERVER | EDGE ID | STATE |
|---|---|---|---|
| 123456 | IoT SERVER 20A | edge-20A-0001 | SECOND CONNECTION INFORMATION CONNECTED |
| ... | ... | ... | ... |

| COMMUNICATION APPARATUS ID | SERVICE | EDGE ID | STATE |
|---|---|---|---|
| 123456 | REMOTE MONITORING | edge-20A-0001 | SECOND CONNECTION INFORMATION ISSUED |
| ... | ... | ... | ... |

| SERVICE | IoT SERVER |
|---|---|
| REMOTE MONITORING | IoT SERVER 20A |
| FAULT DIAGNOSIS | IoT SERVER 20B |
| ... | ... |

401

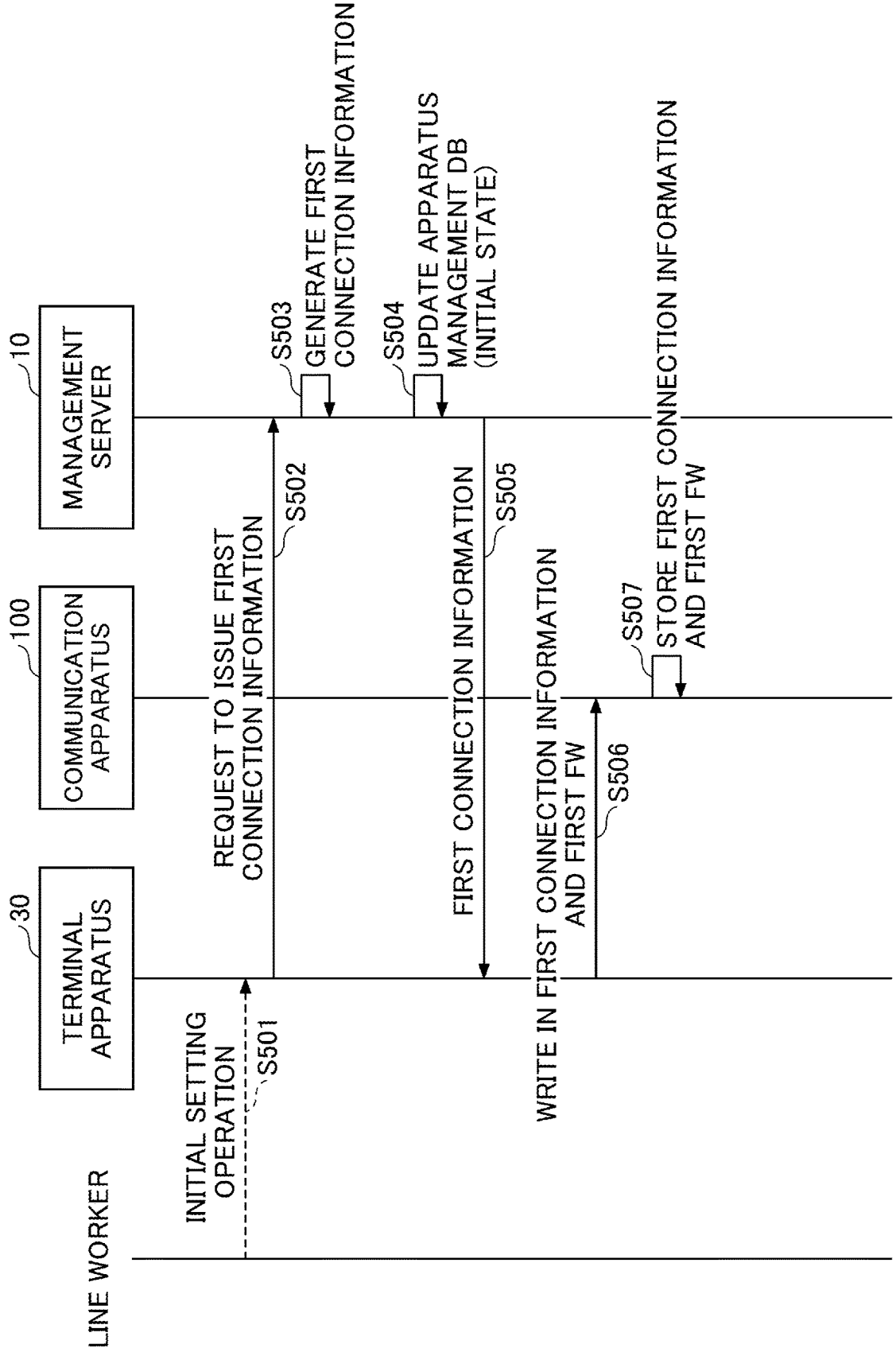

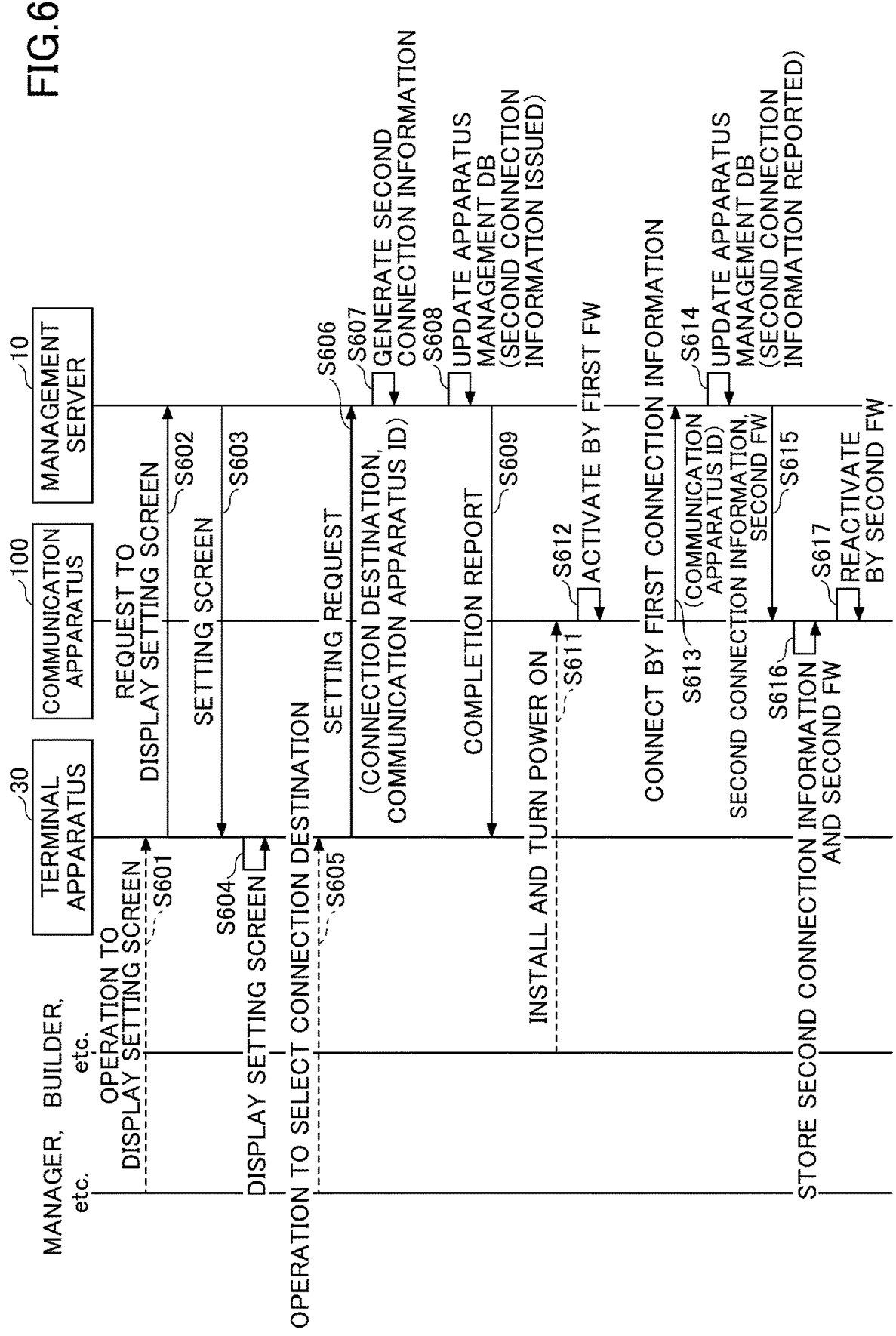

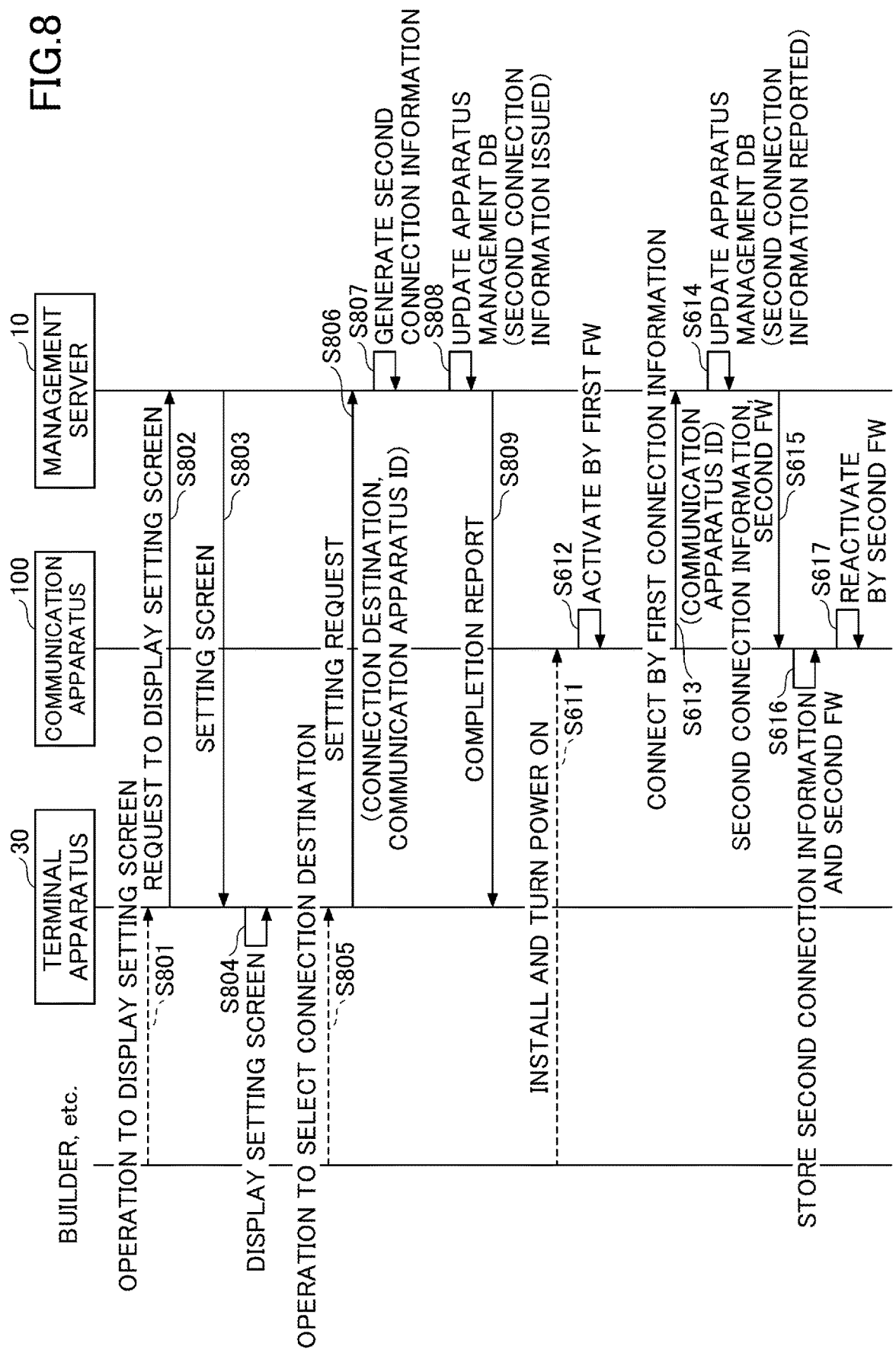

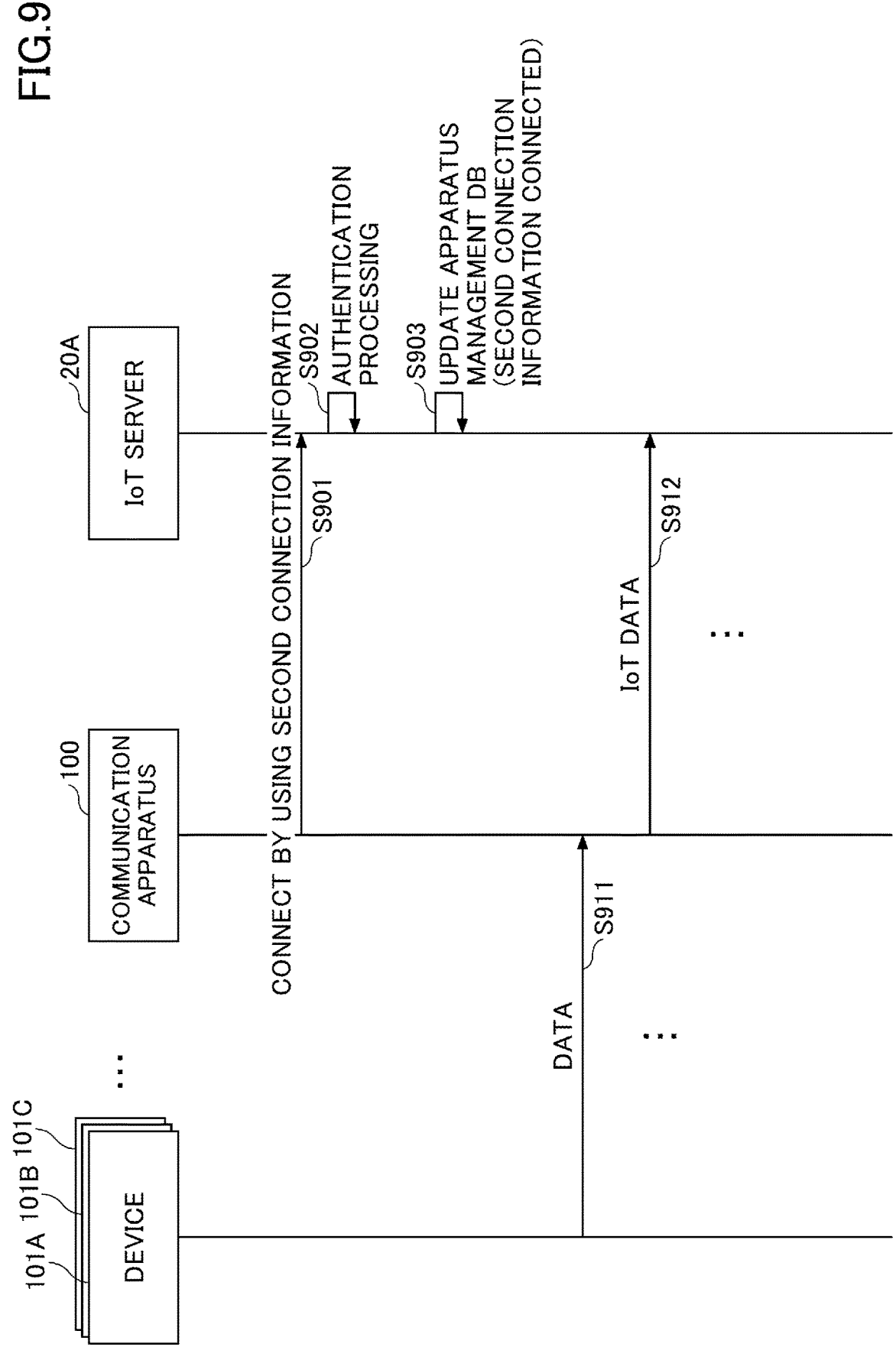

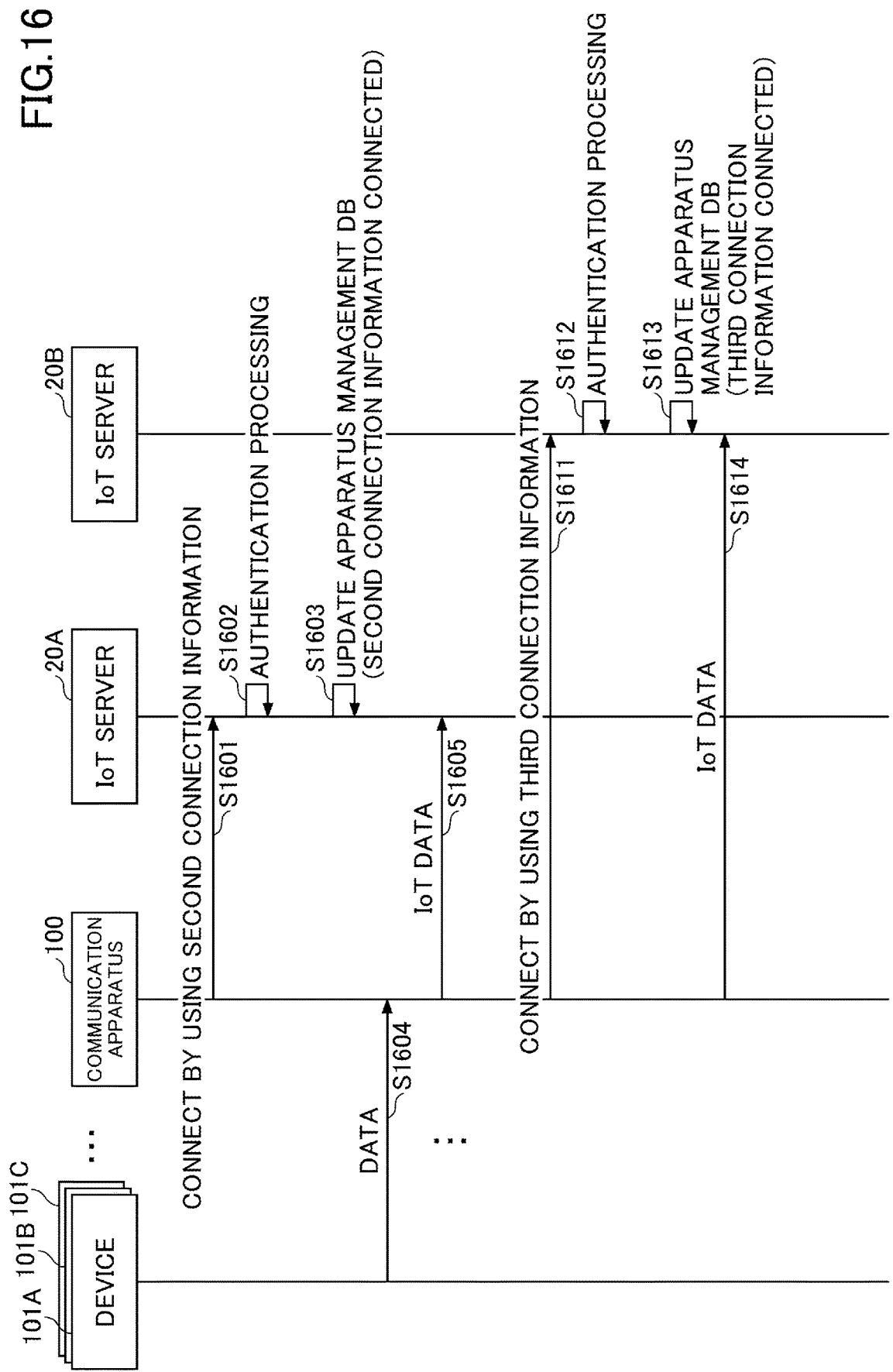

COMMUNICATION APPARATUS, SERVER, COMMUNICATION SYSTEM, AND COMMUNICATION METHOD

TECHNICAL FIELD

The present disclosure relates to a communication apparatus, a server, a communication system, and a communication method.

BACKGROUND ART

There is a gateway device (hereinafter referred to as a communication apparatus) that collects data from an electronic device and transmits, via a communication network, the collected data to an Internet of Things (IoT) server that provides various services such as monitoring of the electronic device.

Further, in order to enable such a communication apparatus to connect to an appropriate connection destination, there is known a technique for transmitting first identification information to a server and acquiring the information of a second connection destination corresponding to the first identification information (see, e.g., Patent Document 1).

CITATION LIST

Patent Document

Patent document 1: Japanese Patent No. 6813110

SUMMARY OF INVENTION

Technical Problem

The communication apparatus as described in Patent Document 1 operates on firmware that is premised on being connected to the server of the own company (cloud service, etc.), and, therefore, it has been difficult to form an alliance with a partner company or the like and connect to another company's server, for example. For example, as described in Patent Document 1, by only acquiring information on the second connection destination, it is sometimes impossible to properly communicate with other communication systems that are operated by various partner companies and that continue to evolve on a daily basis.

The present disclosure makes it possible to appropriately communicate with various kinds of other servers by a communication apparatus communicating with a server, based on connection information and firmware for connecting to the server.

Solution to Problem

A communication apparatus according to a first aspect of the present disclosure is configured to
    communicate with a first server based on first connection information and first firmware for connecting to the first server, and
    acquire, from the first server, second firmware for connecting to a second server different from the first server.

According to the first aspect of the present disclosure, the communication apparatus communicating with the server based on the connection information and the firmware for connecting to the server, can appropriately communicate with various other servers.

A second aspect of the present disclosure is the communication apparatus according to the first aspect, wherein
    the communication apparatus acquires, from the first server, second connection information for connecting to the second server, and
    the second connection information includes authentication information for connecting to the second server.

A third aspect of the present disclosure is the communication apparatus according to the second aspect, wherein the communication apparatus communicates with the second server based on the second connection information and the second firmware.

A fourth aspect of the present disclosure is the communication apparatus according to any one of the first to third aspects, wherein when changing the second server to which the communication apparatus is to be connected, the communication apparatus communicates with the first server based on an instruction from outside, to reacquire firmware for connecting to a different second server that is different from the second server.

A fifth aspect of the present disclosure is the communication apparatus according to any one of the first to fourth aspects, wherein the first connection information and the first firmware are set when the communication apparatus is manufactured.

A server according to a sixth aspect of the present disclosure is a first server and is configured to
    receive a selection of a service to be used by a communication apparatus or a second server,
    receive, from the communication apparatus, first connection information including apparatus identification information identifying the communication apparatus, and
    transmit, to the communication apparatus, second firmware for connecting to the second server providing the service to be used by the communication apparatus.

According to the second aspect of the present disclosure, the server can appropriately provide the communication apparatus with second firmware for connecting to a second server that is the connection destination.

A seventh aspect of the present disclosure is the server according to the sixth aspect, wherein
    the first server
        stores second connection information and the second firmware for connecting to the second server, and
        transmits, to the communication apparatus, the second connection information and the second firmware for connecting to the second server providing the service to be used by the communication apparatus.

An eighth aspect of the present disclosure is the server according to the seventh aspect, wherein
    the second connection information includes authentication information for connecting to the second server, and
    the first server generates the authentication information for connecting to the second server.

A ninth aspect of the present disclosure is the server according to any one of the sixth to eighth aspects, wherein
    the first server
        stores information of the second server to which the communication apparatus is to be connected, for each piece of the apparatus identification information identifying the communication apparatus, and
        determines the second server to which the communication apparatus is to be connected, based on the apparatus identification information.

A tenth aspect of the present disclosure is the server according to any one of the sixth to eighth aspects, wherein the first server
stores the service to be used by the communication apparatus, for each piece of the apparatus identification information identifying the communication apparatus, and
determines the second server to which the communication apparatus is to be connected, according to the service.

A communication system according to an eleventh aspect of the present disclosure includes:
a first server; and
a communication apparatus, wherein
the first server is configured to
receive a selection of a service to be used by the communication apparatus,
receive, from the communication apparatus, first connection information including apparatus identification information identifying the communication apparatus, and
transmit, to the communication apparatus, second firmware for connecting to a second server providing the service to be used by the communication apparatus, and wherein
the communication apparatus is configured to
communicate with the first server based on the first connection information and first firmware for connecting to the first server, and
acquire, from the first server, the second firmware for connecting to the second server different from the first server.

A communication method according to a twelfth aspect of the present disclosure is in a communication system including a first server and a communication apparatus, the communication method including:
receiving, by the first server, a selection of a service to be used by the communication apparatus;
communicating, by the communication apparatus with the first server, based on first connection information and first firmware for connecting to the first server;
receiving, by the first server from the communication apparatus, the first connection information including apparatus identification information identifying the communication apparatus;
transmitting, by the first server to the communication apparatus, second firmware for connecting to a second server providing the service to be used by the communication apparatus; and
acquiring, by the communication apparatus from the first server, the second firmware for connecting to the second server different from the first server.

BRIEF DESCRIPTION OF DRAWINGS

FIG. 4A is a diagram (1) illustrating an example of apparatus information managed by an apparatus management DB according to an embodiment.
FIG. 4B is a diagram (2) illustrating an example of apparatus information managed by an apparatus management DB according to an embodiment.
FIG. 4C is a diagram (3) illustrating an example of apparatus information managed by an apparatus management DB according to an embodiment.
FIG. 4D is a diagram (4) illustrating an example of apparatus information managed by an apparatus management DB according to an embodiment.
FIG. 4E is a diagram (5) illustrating an example of apparatus information managed by an apparatus management DB according to an embodiment.
FIG. 4F is a diagram (6) illustrating an example of apparatus information managed by an apparatus management DB according to an embodiment.
FIG. 5 is a sequence diagram illustrating an example of processing when manufacturing of a communication apparatus according to a first embodiment.
FIG. 6 is a sequence diagram (1) illustrating an example of processing when installing a communication apparatus according to the first embodiment.
FIG. 8 is a sequence diagram (2) illustrating an example of processing when installing a communication apparatus according to the first embodiment.
FIG. 9 is a sequence diagram illustrating an example of processing when collecting data according to the first embodiment.
FIG. 16 is a sequence diagram illustrating an example of processing at the time of data collection according to the second embodiment.

DESCRIPTION OF EMBODIMENTS

Figure 1:
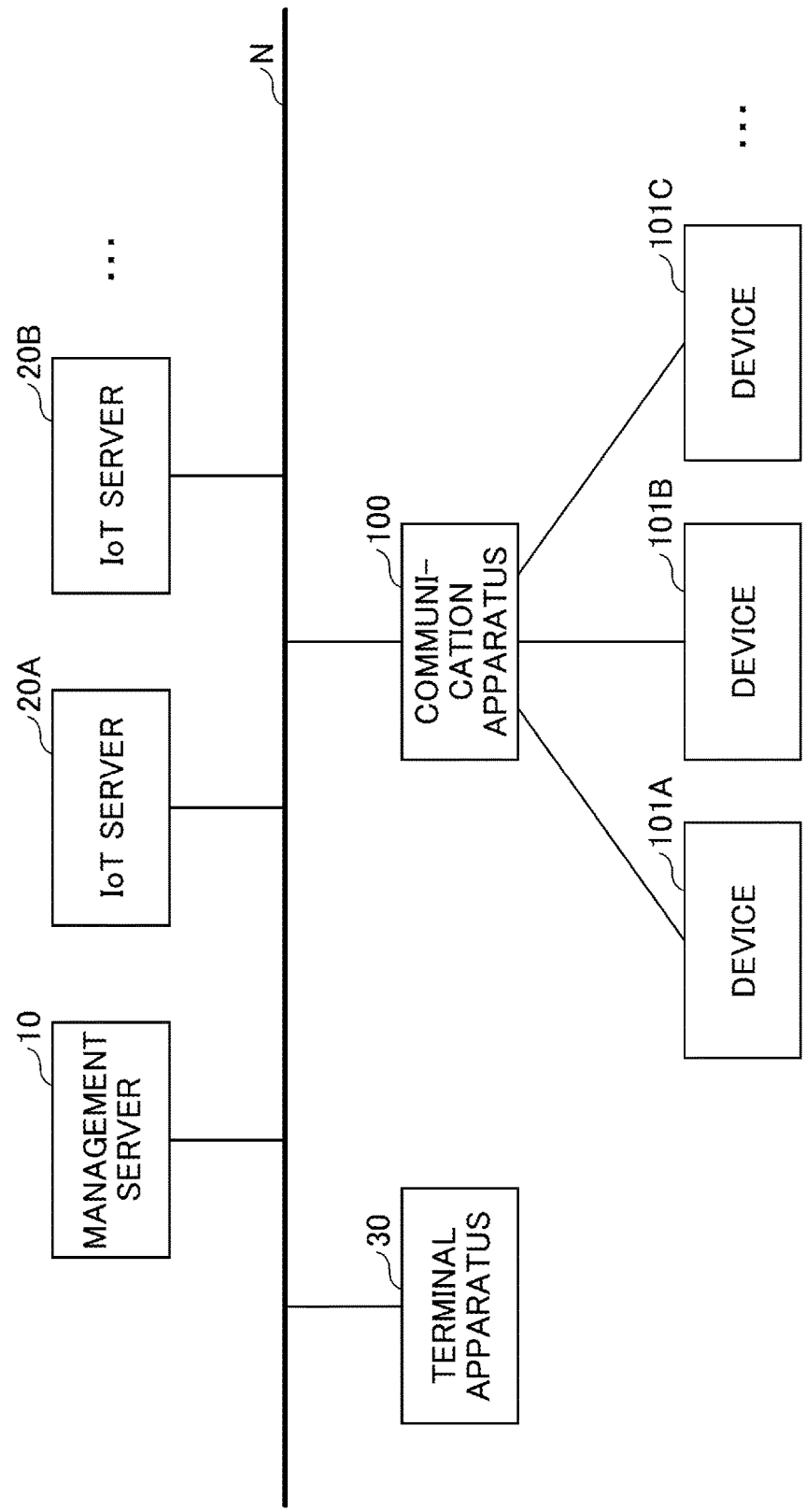
FIG. 1 is a diagram illustrating an example of a system configuration of a communication system according to an embodiment.

Hereinafter, each embodiment will be described with reference to the attached drawings. In the present specification and the drawings, elements having substantially the same functional configuration will be denoted by the same reference numerals to omit duplicate descriptions.

<System Configuration>

FIG. 1 is a diagram illustrating an example of a system configuration of a communication system according to an embodiment. A communication system 1 includes a management server 10 connected to a communication network N, one or more Internet of Things (IoT) servers 20A, 20B, and so forth, a terminal apparatus 30, a communication apparatus 100, and the like. In the following description, when indicating any IoT server among one or more IoT servers 20A, 20B, and so forth, the IoT server is referred to as the "IoT server 20". The number of IoT servers 20 illustrated in FIG. 1 is an example, and may be any other number.

The communication network N is, for example, a network such as the Internet, a local area network (LAN), a wide area network (WAN), or the like. The communication network N may include, for example, a communication section according to wireless communication such as a wireless LAN, a wireless WAN, or the like.

The communication apparatus 100 is, for example, an edge (gateway device) that is communicatively connected to the plurality of devices 101A, 101B, 101C, and so forth, and collects data acquired by the plurality of devices 101A, 101B, 101 C, and so forth, and transmits the acquired data to the IoT server 20. In the following description, the "device 101" is used to indicate any of the plurality of devices 101A, 101B, 101C, and so forth. The communication apparatus 100 may have a function of transmitting an instructed command to the device 101 in accordance with an instruction from the IoT server 20. The device 101 is a device such as an air conditioner, various sensors, etc., which acquires predetermined data and transmits the data to the communication apparatus 100.

The communication apparatus 100 according to the present embodiment stores, in advance, connection information (hereinafter referred to as the first connection information) and firmware (hereinafter referred to as the first firmware) for connection to the management server 10. Further, the communication apparatus 100 connects to the management server 10 by using the first connection information and the first firmware the first time the power is turned on, for example, and acquires connection information (hereinafter referred to as the second connection information) and firmware (hereinafter referred to as the second firmware) for connection to the IoT server that is the connection destination.

The second connection information includes, for example, the URL (Uniform Resource Locator) of the IoT server that is the connection destination, and authentication information, etc., for authenticating the communication apparatus 100. The firmware is a program (software) incorporated into the communication apparatus 100 for controlling the communication apparatus 100. The second firmware includes, for example, a communication protocol, an authentication method, a data format, setting information and the like for communicating with the IoT server 20 that is the connection destination.

The management server (first server) 10 is, for example, an information processing apparatus having a computer configuration or a system including a plurality of computers. The management server 10 displays, on the terminal apparatus 30, for example, a selection screen for selecting a connection destination of the communication apparatus 100 and receives a selection of a service to be used by the communication apparatus 100 or the IoT server (second server) 20. When the communication apparatus 100 connects to the management server 10, the management server 10 receives, from the communication apparatus 100, apparatus identification information (hereinafter referred to as communication apparatus ID) identifying the communication apparatus 100 and identifies the IoT server that is the connection destination of the communication apparatus 100 selected on the selection screen. Furthermore, the management server 10 transmits, to the communication apparatus 100, the second connection information and the second firmware for connecting to the IoT server that is the connection destination of the communication apparatus 100. A part of or the entirety of the second connection information may be included in the second firmware.

The terminal apparatus 30 is, for example, an information terminal such as a personal computer (PC), a tablet terminal, a smartphone or the like. The terminal apparatus 30 includes various terminal apparatuses such as, for example, a terminal apparatus used by a worker on a manufacturing line for manufacturing the communication apparatus 100, a terminal apparatus used by a manager or the like who manages the communication apparatus 100, or a terminal apparatus used by a builder who installs the communication apparatus 100.

The IoT server (second server) 20 is, for example, an information processing apparatus having a computer configuration or a system including a plurality of computers. The IoT server 20 receives IoT data transmitted by the communication apparatus 100, performs data processing, and provides various services, for example, remote monitoring and fault diagnosis.

With the above configuration, the communication apparatus 100 according to the present embodiment can acquire, from the management server 10, not only the second connection information of the IoT server 20 that is the connection destination but also the second firmware for connecting to the IoT server 20 that is the connection destination. Accordingly, the communication apparatus 100 according to the present embodiment can appropriately communicate with other communication systems that are operated by various partner companies and continue to evolve daily.

According to the present embodiment, the communication apparatus 100 that communicates with the server based on connection information and firmware for connecting to the server, can appropriately communicate with other communication systems.

<Hardware Configuration>

Figure 2:
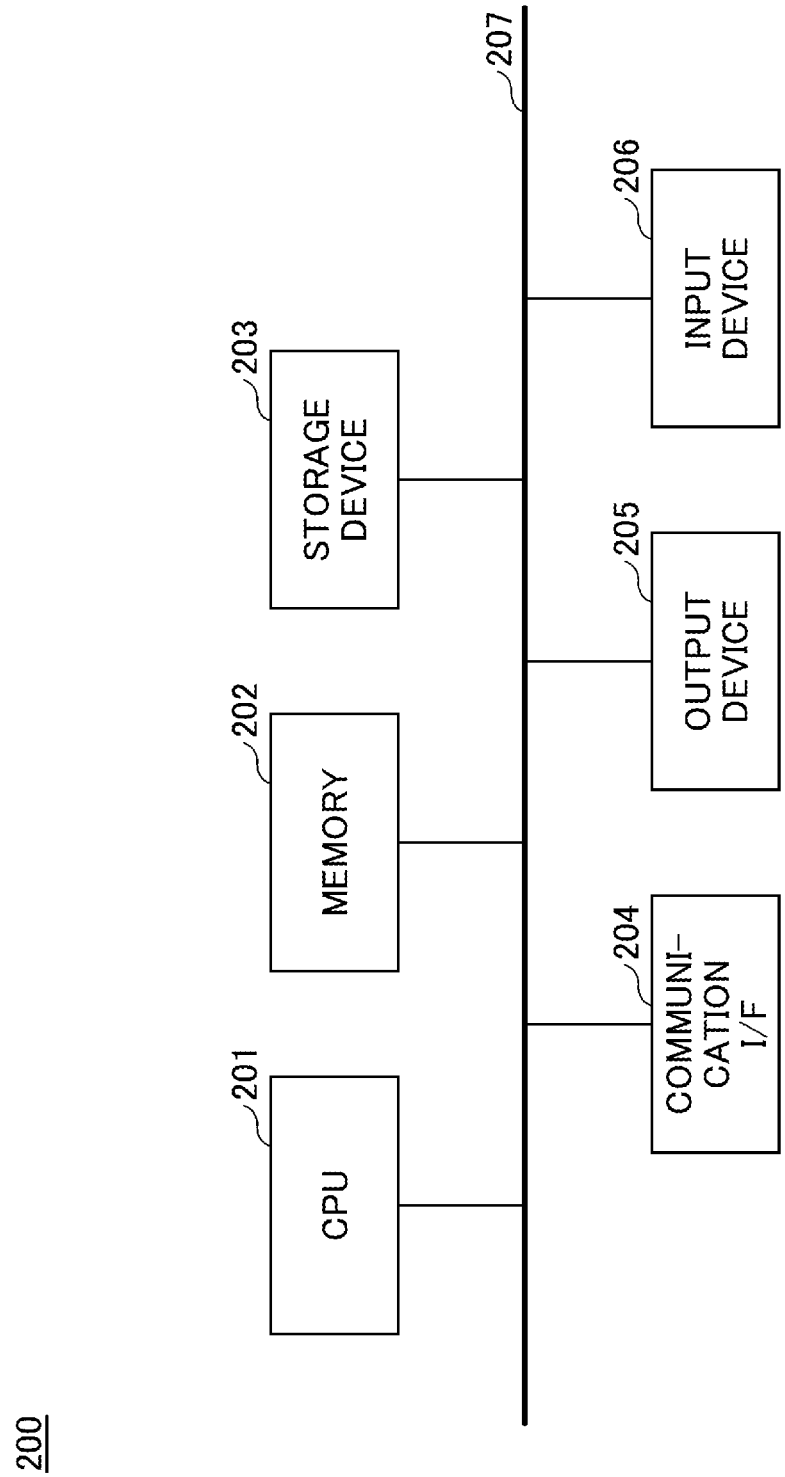
FIG. 2 is a diagram illustrating an example of a hardware configuration of a computer according to an embodiment.

The communication apparatus 100, the management server 10, the IoT server 20, and the terminal apparatus 30, etc., according to the present embodiment have, for example, a hardware configuration of a computer 200 as illustrated in FIG. 2. Alternatively, the management server 10 and the IoT server 20, etc., are configured by a plurality of the computers 200.

FIG. 2 is a diagram illustrating an example of a hardware configuration of a computer according to an embodiment. The computer 200 includes, for example, a CPU (Central Processing Unit) 201, a memory 202, a storage device 203, a communication I/F (Interface) 204, an output device 205, an input device 206, and a bus 207.

The CPU 201 is a processor that performs various functions by executing predetermined programs stored in a recording medium such as, for example, the storage device 203 or the memory 202. The memory 202 includes, for example, a RAM (Random Access Memory), which is a volatile memory used as a work area of the CPU 201, and a ROM (Read Only Memory), which is a nonvolatile memory that stores programs for activating the computer 200. The storage device 203 is a large-capacity storage device for storing an OS (Operating System), a program such as an application, various kinds of data, information, etc., and is implemented by, for example, an SSD (Solid State Drive) or a HDD (Hard Disk Drive).

The communication I/F 204 includes one or more communication interfaces, for example, a LAN, a WAN (Wide Area Network), etc., that connect the computer 200 to the communication network N to communicate with other apparatuses. The output device 205 includes a display apparatus that displays various display screens, or a voice output device that outputs voice messages, error sounds, etc. The input device 206 is, for example, an input device that receives input, such as a touch panel, a keyboard, or a pointing device. The output device 205 and the input device 206 may be, for example, a display input device such as a touch panel display. The bus 207 is connected to each of the above elements and transmits, for example, an address signal, a data signal, and various control signals.

(Hardware Configuration of the Device)

In the present embodiment, the hardware configuration of the device 101 may be any configuration, and the description thereof will be omitted here.

<Functional Configuration>

Figure 3:
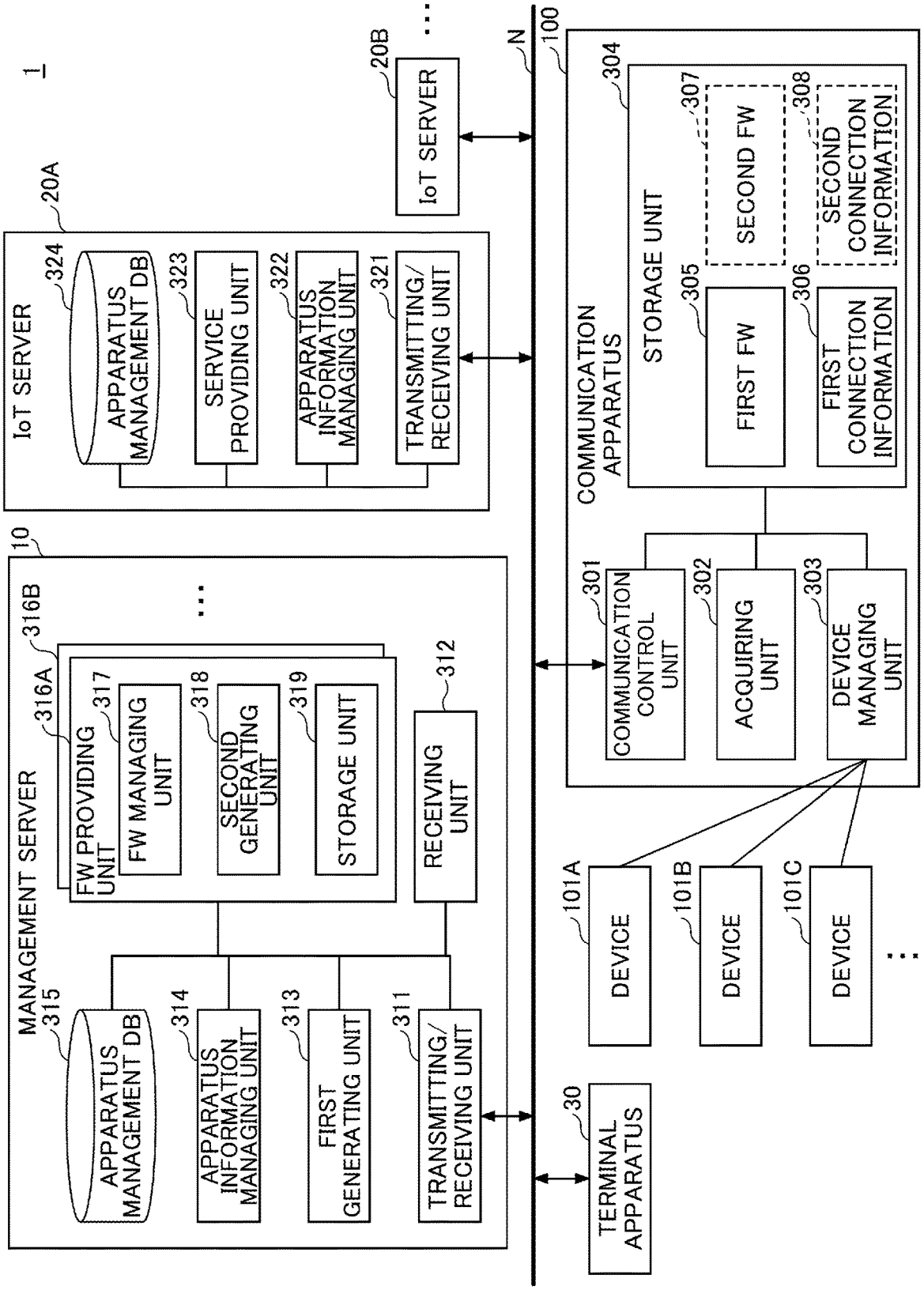
FIG. 3 is a diagram illustrating an example of a functional configuration of a communication system according to an embodiment.

FIG. 3 is a diagram illustrating an example of a functional configuration of a communication system according to an embodiment.

(Functional Configuration of Communication Apparatus)

The communication apparatus 100 includes, for example, a communication control unit 301, an acquiring unit 302, a device managing unit 303, and a storage unit 304.

The communication control unit 301 is implemented by first firmware (hereinafter referred to as the first FW) 305 or second firmware (hereinafter referred to as the second FW) 307 executed by the CPU 201 provided in the communication apparatus 100. For example, when the CPU 201 executes the first FW 305, the communication control unit 301 communicates with the management server (first server) 10 by using the first connection information. On the other hand, when the CPU 201 executes the second FW 307, the communication control unit 301 communicates with the IoT server (second server) 20 that is the connection destination by using the second connection information.

The acquiring unit 302 is implemented by a program (the first FW 305) executed by the CPU 201, and acquires, from the management server 10, the second FW 307, second connection information 308, and the like, for connecting to the IoT server 20 that is the connection destination. Note that the second connection information 308 may be included in the second FW 307. In this case, the acquiring unit 302 may acquire the second FW 307 from the management server 10.

The device managing unit 303 is implemented by a program (the second FW 307) executed by the CPU 201, and transmits the IoT data collected from the plurality of devices 101 to the IoT server 20 that is the connection destination via the communication control unit 301.

The storage unit 304 is implemented by, for example, the storage device 203 provided in the communication apparatus 100, and stores in advance the first FW 305 and the first connection information 306. The storage unit 304 stores the second FW 307 and the second connection information 308 acquired by the acquiring unit 302.

(Functional Configuration of Management Server)

The management server (first server) 10 implements a transmitting/receiving unit 311, a receiving unit 312, a first generating unit 313, an apparatus information managing unit 314, an apparatus management DB 315, and FW providing units 316A, 316B, and so forth, by executing a predetermined program on the computer 200 provided in the management server 10. At least a part of the above functional configurations may be implemented by hardware.

The transmitting/receiving unit 311 connects the management server 10 to the communication network N by using the communication I/F 204 provided in the management server 10, and executes transmission processing for transmitting data to other apparatuses and reception processing for receiving data from other apparatuses.

For example, the receiving unit 312 provides, to the terminal apparatus 30 or the like, a web UI (User Interface) for displaying a display screen such as a setting screen for setting the connection destination of the communication apparatus 100, and receives a setting operation, an input operation, or a selection operation on the display screen. The receiving unit 312 also provides a web API (Application Programming Interface) for using the function provided by the management server 10 from the IoT server 20, the terminal apparatus 30, the communication apparatus 100 or the like, and receives request information from each apparatus.

The first generating unit 313 generates first connection information 306 for the communication apparatus 100 to connect to the management server 10 in response to a request to issue first connection information from, for example, the exclusive-use terminal apparatus 30 provided in a manufacturing line for manufacturing the communication apparatus 100. The first connection information 306 generated by the first generating unit 313 includes, for example, URL information of the management server 10 and authentication information for connecting to the management server 10.

The apparatus information managing unit 314 stores and manages apparatus information 400a to 400e of the communication apparatus 100, such as those illustrated in FIGS. 4A to 4E, in the apparatus management DB 315. In the following description, when referring to any apparatus information among the apparatus information 400a to 400e, "apparatus information 400" is used.

In the examples of FIGS. 4A to 4D, the apparatus information 400 includes information such as "communication apparatus ID", "IoT server", "edge ID", and "state" as items. The "communication apparatus ID" is identification information identifying the hardware of the communication apparatus 100. The "IoT server" is identification information identifying the IoT server that is the connection destination of the communication apparatus 100, or information such as a name. The "edge ID" is identification information identifying the communication apparatus 100 functioning as an edge in the service provided by the "IoT server". The "state" is information indicating the state of the communication apparatus 100.

As illustrated in FIG. 4E, the apparatus information 400 may have an item of "service" instead of "Iot server". "Service" is information indicating a service provided by the IoT server 20. In this case, as illustrated in FIG. 4F, the apparatus information managing unit 314 stores association information 401 indicating the association relationship between "service" and "IoT server" in the apparatus management DB 315, etc., so that the identification information, name, etc., of the IoT server 20 providing the "service" can be identified.

The apparatus management DB 315 is, for example, a database for storing the apparatus information 400 as illustrated in FIGS. 4A to 4E. The apparatus management DB 315 stores information of the IoT server 20 that is the connection destination, for each communication apparatus ID identifying the communication apparatus 100. A part of the functions of the apparatus management DB 315 may be implemented by the apparatus management DB 324 provided in the IoT servers 20A, 20B, and so forth. For example, among the apparatus information 400a to 400e illustrated in FIGS. 4A to 4E, the apparatus information 400d may be managed by the apparatus management DB 315 of the management server or by the apparatus management DB 324 of the IoT server 20. The apparatus management DB 315 and 324 may be implemented by another computer 200 different from the management server 10 and the IoT server 20.

The FW providing units 316A, 316B, and so forth execute processing for providing the second FW 307 and the second connection information 308 for connecting to the IoT servers 20A, 20B, and so forth. For example, the FW providing unit 316A executes processing for providing the communication apparatus 100 with the second FW 307 and the second connection information 308 for connecting to the IoT server 20A. Similarly, the FW providing unit 316B executes processing for providing the communication apparatus 100 with the second FW 307 and the second connection information 308 for connecting to the IoT server 20B. In the following description, when referring to any FW providing unit among the FW providing units 316A, 316B, and so forth, the "FW providing unit 316" is used. In FIG. 3, it is assumed that the FW providing units 316B and so forth have the same functional configuration as the FW providing unit 316A.

The FW providing unit 316 includes, for example, a FW managing unit 317, a second generating unit 318, and a storage unit 319.

The FW managing unit 317 stores and manages the second FW 307 for connecting to the IoT server 20 corresponding to the FW providing unit 316, in the storage unit 319 or the like. For example, the FW managing unit 317 of the FW providing unit 316A stores and manages the second FW 307 for connecting to the IoT server 20A, in the storage unit 319 or the like.

The second generating unit 318 generates the second connection information 308 for connecting to the IoT server 20 corresponding to the FW providing unit 316. For example, the second generating unit 318 of the FW providing unit 316A generates the second connection information 308 for connecting to the IoT server 20A. The FW providing unit 316 may request the IoT server 20 to generate the second connection information 308. For example, the FW providing unit 316A may request the IoT server 20A to generate the second connection information 308 without having the second generating unit 318. In this case, the FW providing unit 316 serves as a bridge with the IoT server 20. The second connection information 308 includes, for example, the URL of the IoT server 20 that is the connection destination, an edge ID identifying the communication apparatus 100 serving as an edge in the service provided by the IoT server that is the connection destination, and a device certificate (an example of authentication information).

The storage unit 319 stores, for example, the second FW 307 managed by the FW managing unit 317 and the second connection information 308 generated by the second generating unit 318.

(Functional Configuration of IoT Server)

The IoT server (second server) 20 implements a transmitting/receiving unit 321, an apparatus information managing unit 322, a service providing unit 323, an apparatus management DB 324, and the like by executing a predetermined program on the computer 200 provided in the IoT server 20. At least a part of the above functional configurations may be implemented by hardware.

The transmitting/receiving unit 321 connects the IoT server 20 to the communication network N by using the communication I/F 204 provided in the IoT server 20, and executes transmission processing for transmitting data to other apparatuses and reception processing for receiving data from other apparatuses.

The apparatus information managing unit 322 stores and manages the state of the communication apparatus 100 connected to the IoT server 20, in the apparatus management DB 324 or the like. The apparatus information managing unit 322 may store and manage the state of the communication apparatus 100 connected to the IoT server, in the apparatus management DB 324 provided in the management server 10. For example, the apparatus information managing unit 322 may register the state of the communication apparatus 100 in the apparatus management DB 315 by using a web API provided by the receiving unit 312, or may report, to the apparatus information managing unit 314 of the management server 10, the state of the communication apparatus 100. The apparatus management DB 324 stores information indicating the state of the communication apparatus 100 connected to the IoT server 20, for example, the apparatus information 400d as illustrated in FIG. 4D.

The service providing unit 323 provides services such as a remote monitoring service and a fault diagnosis service provided by the IoT server 20.

<Processing Flow>

Next, the processing flow of the communication method according to the present embodiment will be described.

First Embodiment (Processing when Manufacturing Communication Apparatus)

FIG. 5 is a sequence diagram illustrating an example of processing when manufacturing the communication apparatus according to the first embodiment. This process illustrates an example of a process for storing the first FW 305, the first connection information 306, and the like in the communication apparatus 100 in a line for manufacturing the communication apparatus 100. It is assumed that the terminal apparatus 30 has already logged in to the management server 10 at the start of the processing illustrated in FIG. 5.

In step S501, when the line worker performs the initial setting operation of the communication apparatus 100, with respect to the exclusive-use terminal apparatus 30 provided on the line, the communication system 1 executes the processing from step S502 and onward.

In step S502, the terminal apparatus 30 transmits a request for issuing the first connection information 306 to the management server 10.

In step S503, when the receiving unit 312 of the management server 10 receives the request for issuing the first connection information, the first generating unit 313 generates the first connection information for the communication apparatus 100 to connect to the management server 10. The first connection information includes, for example, a URL for connecting to the management server 10 and authentication information. Preferably, the first generating unit 313 generates unique authentication information for each communication apparatus 100.

In step S504, the apparatus information managing unit 314 of the management server 10 updates the apparatus management DB 315. For example, the apparatus information managing unit 314 updates the item "state" of the apparatus information 400a of the communication apparatus 100 to "initial state" as illustrated in FIG. 4A. The communication apparatus ID of the communication apparatus 100 may be issued by the terminal apparatus 30 or by the management server 10. When the terminal apparatus 30 issues the communication apparatus ID, in step S502, the terminal apparatus 30 transmits, to the management server 10, a request for issuing the first connection information including the communication apparatus ID of the communication apparatus 100.

In step S505, the transmitting/receiving unit 311 of the management server 10 transmits the first connection information 306 generated by the first generating unit 313 to the terminal apparatus that is the request source.

In step S506, the terminal apparatus 30 writes the first connection information 306 received from the management server 10 and the first FW 305 into the communication apparatus 100.

In step S507, the first connection information 306 and the first FW 305 are stored in the storage unit 304 of the communication apparatus 100. The communication apparatus 100 is shipped from the factory in this state (initial state), for example.

(Processing 1 at the Time of Installation of the Communication Apparatus)

FIG. 6 is a sequence diagram (1) illustrating an example of processing at the time of installation of the communication apparatus according to the first embodiment. This processing illustrates an example of the processing for installing, at a predetermined location, the communication apparatus 100 in which the first FW 305 and the first connection information 306 are stored in the storage unit 304 by the processing illustrated in FIG. 5, and connecting the communication apparatus 100 to the IoT server 20.

In step S601, a system administrator who manages the communication system 1 or a manager such as a shipment administrator who manages the shipment of the communication apparatus 100 (hereinafter referred to as a manager, etc.) performs a display operation of the displaying setting screen with respect to the terminal apparatus 30. Here, the terminal apparatus 30 is any information terminal logged in to the management server 10 and can display a display screen (web page) provided by the management server 10, by using a web browser or an application program (hereinafter referred to as an app) corresponding to the communication system 1. The terminal apparatus 30 illustrated in FIG. 6 may be different from the terminal apparatus 30 illustrated in FIG. 5.

In step S602, when the terminal apparatus 30 receives the display operation for displaying the setting screen by the manager or the like, the terminal apparatus 30 transmits a display request for displaying the setting screen to the management server 10.

Figure 7A:
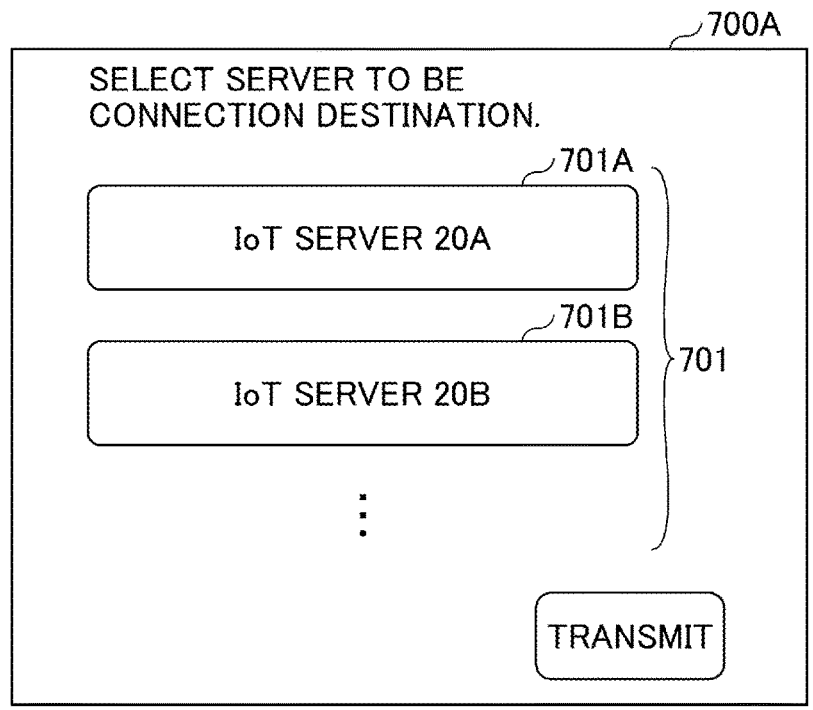
FIG. 7A is a diagram (1) illustrating an example of a setting screen according to the first embodiment.
Figure 7B:
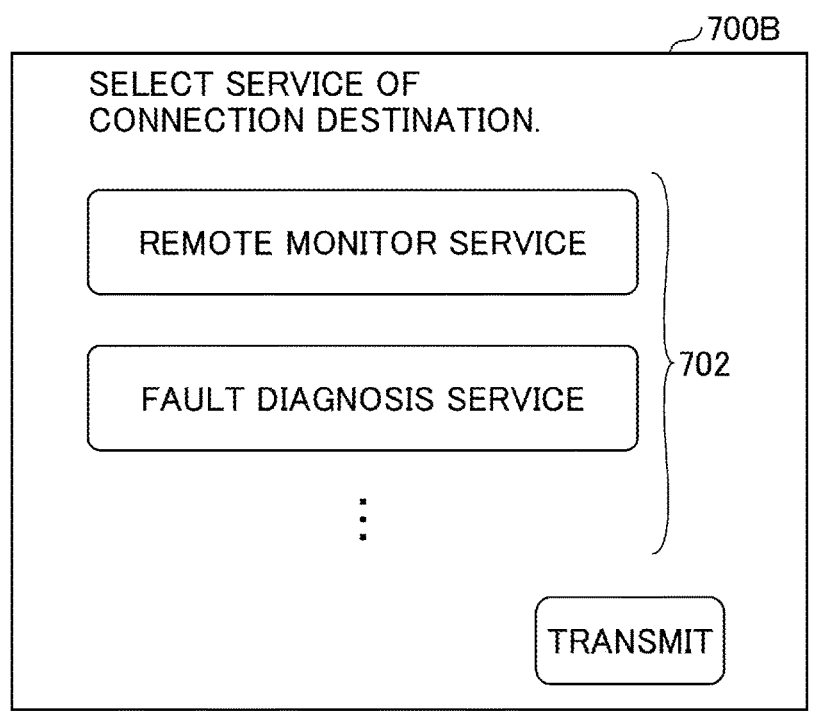
FIG. 7B is a diagram (2) illustrating an example of a setting screen according to the first embodiment.

In steps S603 and S604, when the receiving unit 312 of the management server 10 receives the display request for displaying the setting screen, the receiving unit 312 displays, on the terminal apparatus 30, for example, a setting screen 700A as illustrated in FIG. 7A or a setting screen 700B as illustrated in FIG. 7B.

FIG. 7A illustrates an example of the setting screen for setting the connection destination displayed by the terminal apparatus 30. The setting screen 700A illustrated in FIG. 7A displays a plurality of selection buttons 701 for selectably displaying the IoT servers 20A, 20B, and so forth that are candidates for the connection destination of the communication apparatus 100. When connecting the communication apparatus 100 to the IoT server 20A, the manager or the like selects the selection button 701A for selecting the "IoT server 20A" from among the plurality of selection buttons 701.

FIG. 7B illustrates another example of a screen for selecting a connection destination displayed by the terminal apparatus 30. The setting screen 700B illustrated in FIG. 7B displays a plurality of selection buttons 702 for selectably displaying the services (for example, a remote monitoring service, a fault diagnosis service, and so on, etc.) available to the communication apparatus 100. For example, the receiving unit 312 of the management server 10 may display the setting screen 700B illustrated in FIG. 7B on the terminal apparatus by using the association information 401 indicating the association relationship between the IoT server 20 and the services provided by each IoT server 20 as illustrated in FIG. 4F.

Now, returning to FIG. 6, the description of the sequence diagram is continued. In step S605, the manager or the like performs a connection destination selection operation on the setting screens illustrated in FIGS. 7A and 7B, for example. Here, as an example, the following description is given assuming that the manager or the like selects the selection button 701A for selecting the "IoT server 20A" from the setting screen 700A illustrated in FIG. 7A.

In step S606, when the terminal apparatus 30 receives an operation for selecting a connection destination by the manager or the like, the terminal apparatus 30 transmits, to the management server 10, a setting request including information on the selected connection destination (the IoT server 20A) and a communication apparatus ID identifying the communication apparatus 100.

In step S607, when the receiving unit 312 of the management server 10 receives a setting request, the second generating unit 318 of the FW providing unit 316A corresponding to the connection destination (the IoT server 20A) included in the setting request, generates the second connection information 308. For example, the second generating unit 318 generates the second connection information 308 including a URL of the IoT server 20A, an edge ID identifying the communication apparatus 100 serving as an edge in the IoT server 20A, a device certificate (electronic certificate) of the communication apparatus 100, and the like. The device certificate of the communication apparatus 100 is an example of authentication information and may be other authentication information. The second generating unit 318 stores the generated second connection information 308 in the storage unit 319 or the like in association with the communication apparatus ID of the communication apparatus 100.

In step S608, the apparatus information managing unit 314 of the management server 10 updates the apparatus management DB 315. For example, at the start of the processing illustrated in FIG. 6, the apparatus management DB 315 stores the apparatus information 400a of the communication apparatus 100 as illustrated in FIG. 4A. The apparatus information managing unit 314 updates the information such as "IoT server", "edge ID", "state", and the like of the apparatus information 400a to the apparatus information 400b as illustrated in FIG. 4B.

In the apparatus information 400b illustrated in FIG. 4B, the information of the IoT server 20A that is the connection destination is stored in the item "IoT server", and the edge ID generated by the second generating unit 318 is stored in the item "edge ID". The apparatus information managing unit 314 updates the item "state" of the apparatus information 400b to "second connection information issued".

In step S609, the transmitting/receiving unit 311 of the management server 10 transmits a completion report indicating that the setting has been completed to the terminal apparatus 30 that is the request source.

When the builder, etc., installs the communication apparatus 100 and turns on the power of the communication apparatus 100 at any timing after executing the processing in steps S601 to S609 (step S611), the communication system 1 executes the processing in step S612 and thereafter.

In step S612, the communication apparatus 100 is activated by the first FW 305 previously stored in the storage unit 304. In step S613, the communication control unit 301 of the communication apparatus 100 is connected to the management server by using the first connection information 306 previously stored in the storage unit 304. At this time, the communication control unit 301 of the communication apparatus 100 transmits a communication apparatus ID identifying the communication apparatus 100 to the management server 10.

In step S614, the apparatus information managing unit 314 of the management server 10 updates the apparatus management DB 315. For example, the apparatus information managing unit 314 changes the item "state" of the apparatus information 400b illustrated in FIG. 4B to "second connection information reported" and the information is updated to the apparatus information 400c illustrated in FIG. 4C.

In step S615, the FW providing unit 316A of the management server 10 transmits, to the communication apparatus 100, the second connection information 308 corresponding to the communication apparatus ID of the communication apparatus 100 stored in the storage unit 319 and the second FW 307 for connecting to the IoT server 20A.

As described above, the apparatus management DB 315 stores the IoT server 20 information that is the connection destination for each communication apparatus ID identifying the communication apparatus 100. Therefore, the management server 10 can determine the IoT server 20A that is the connection destination of the communication apparatus 100 and the FW providing unit 316A corresponding to the IoT server 20A based on the communication apparatus ID.

In step S616, the acquiring unit 302 of the communication apparatus 100 stores, in the storage unit 304, the second FW 307 received from the management server 10 and the second connection information 308.

In step S617, the communication apparatus 100 is reactivated by the second FW 307 stored in the storage unit 304.

By the process illustrated in FIG. 6, the communication apparatus 100 can connect to the IoT server 20A that is the connection destination set in the setting screen 700A or the like and communicate appropriately, by using the second connection information 308 acquired from the management server and the second FW 307.

(Processing 2 at the Time of Installation of the Communication Apparatus)

FIG. 8 is a sequence diagram (2) illustrating an example of processing at the time of installation of the communication apparatus according to the first embodiment. This processing illustrates another example of the processing for installing, at a predetermined location, the communication apparatus 100 in which the first FW 305 and the first connection information 306 are stored in the storage unit 304 by the processing illustrated in FIG. 5, and connecting the communication apparatus 100 to the IoT server 20.

The process from step S611 in FIG. 8 is the same as the process at the time of installation of the communication apparatus described in FIG. 6, and, therefore, the description thereof will be omitted here. Further, the basic process contents of steps S801 to S809 are the same as those of steps S601 to S609 in FIG. 6, and, therefore, the detailed description thereof will be omitted here.

In step S801, the builder or the like who installs the communication apparatus 100 performs a display operation of displaying the setting screen with respect to the terminal apparatus 30.

In step S802, when the terminal apparatus 30 receives a display operation of displaying the setting screen by the operator or the like, the terminal apparatus 30 transmits a display request to display the setting screen to the management server 10.

In steps S803 and S804, when the receiving unit 312 of the management server 10 receives the display request to display the setting screen, the receiving unit 312 causes the terminal apparatus 30 to display, for example, the setting screen 700A as illustrated in FIG. 7A or the setting screen 700B as illustrated in FIG. 7B.

In step S805, the builder or the like selects a selection button 701A for selecting the "IoT server 20A" from, for example, the setting screen 700A as illustrated in FIG. 7A.

In step S806, when the terminal apparatus 30 receives an operation for selecting a connection destination by the builder or the like, the terminal apparatus 30 transmits, to the management server 10, a setting request including information on the selected connection destination (the IoT server 20A) and the communication apparatus ID of the communication apparatus 100.

In step S807, when the receiving unit 312 of the management server 10 receives the setting request, the second generating unit 318 of the FW providing unit 316A corresponding to the connection destination (the IoT server 20A) included in the setting request, generates the second connection information 308.

In step S808, the apparatus information managing unit 314 of the management server 10 updates the apparatus management DB 315.

In step S809, the transmitting/receiving unit 311 of the management server 10 transmits a completion report indicating that the setting has been completed to the terminal apparatus 30 that is the request source.

As described above, it is desirable that the processing of steps S801 to S809 in FIG. 8 can be carried out by the builder, etc., even if the manager, etc., is not present.

(Processing at the Time of Data Collection)

FIG. 9 is a sequence diagram illustrating an example of processing at the time of data collection according to the first embodiment. This processing illustrates an example of processing executed by the communication apparatus 100 after being reactivated by the second FW 307 in step S617 of FIGS. 6 and 8.

In step S901, when the communication apparatus 100 is reactivated by the second FW 307, the communication apparatus 100 connects to the IoT server 20A that is the connection destination, by using the second connection information 308.

In step S902, the apparatus information managing unit 322 of the IoT server 20A performs authentication processing of the communication apparatus 100 based on the second connection information 308 received from the communication apparatus 100. For example, the apparatus information managing unit 322 verifies whether the authentication information (for example, a device certificate) included in the second connection information is legitimate authentication information. Here, the communication apparatus 100 has legitimate second connection information 308 issued by the management server 10, and, therefore, the apparatus information managing unit 322 permits connection by the communication apparatus 100.

In step S903, the apparatus information managing unit 322 of the IoT server 20A updates the apparatus management DB 324. For example, as illustrated in FIG. 4D, the apparatus information managing unit 322 updates the item "state" of the apparatus information 400d of the communication apparatus 100 stored in the apparatus management DB 324 to "second connection information connected". As described above, the apparatus information managing unit 322 may update the apparatus information 400 stored in the apparatus management DB 315 of the management server 10 by using a web API or the like provided by the receiving unit 312 of the management server 10.

By the above process, the communication apparatus 100 is communicatively connected to the IoT server 20A, and can execute data collection processing as illustrated in steps S911 and S912, for example.

In step S911, the device managing unit 303 of the communication apparatus 100 collects data transmitted by the plurality of devices 101A, 101B, 101C, and so forth.

In step S912, the device managing unit 303 of the communication apparatus 100 transmits the collected data as IoT data to the IoT server 20A at a predetermined timing. At this time, the type of data collected by the device managing unit 303, the timing of transmitting IoT data, the format of IoT data and the like are all programmed in the second FW 307. Accordingly, the communication apparatus 100 can appropriately communicate with the IoT server 20A that is the connection destination.

As described above, the communication apparatus 100 according to the present embodiment acquires the second FW 307 in addition to the second connection information 308 in accordance with the IoT server 20 that is the connection destination, and reactivates the communication apparatus 100 by the acquired second FW 307. Therefore, the communication apparatus 100 can appropriately communicate with other IoT servers even when the IoT server 20 that is the connection destination is changed to another IoT server (for example, the IoT server 20B).

(Connection Destination Changing Processing 1)

Figure 10:
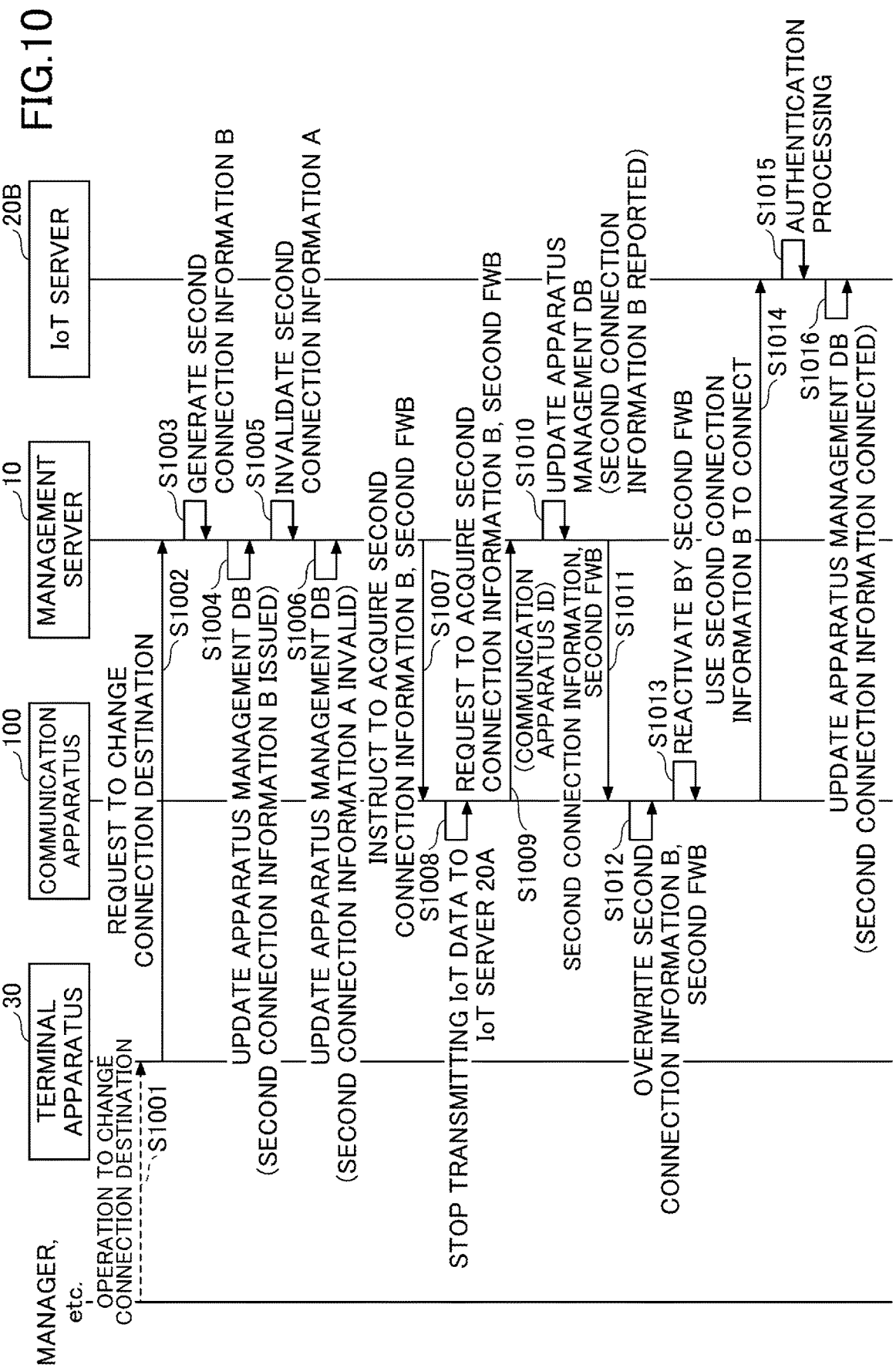
FIG. 10 is a sequence diagram (1) illustrating an example of processing for changing the connection destination according to the first embodiment.

FIG. 10 is a sequence diagram (1) illustrating an example of connection destination changing processing according to the first embodiment. This processing illustrates an example of processing in which the communication apparatus 100 communicates with the management server 10 based on an instruction from outside such as that from the management server 10 or the IoT server 20A to reacquire the second FW 307 for connecting to another IoT server 20B.

In the following description, the second connection information 308 for connecting to the IoT server 20A is defined as "second connection information A", and the second connection information 308 for connecting to the IoT server 20B is defined as "second connection information B", to distinguish these from each other. The second FW 307 for connecting to the IoT server 20A is defined as "second FWA", and the second FW 307 for connecting to the IoT server 20B is defined as "second FWB", to distinguish these from each other.

At the start of the processing illustrated in FIG. 10, it is assumed that the terminal apparatus is displaying a change screen for changing the connection destination of the communication apparatus 100, for example, by the same procedures as in steps S802 to S804 of FIG. 8.

In step S1001, the manager or the like performs a change operation for changing the connection destination of the communication apparatus 100 to the IoT server 20B, on the change screen displayed by the terminal apparatus 30.

In step S1002, when the terminal apparatus receives the change operation for changing the connection destination by the manager or the like, the terminal apparatus 30 transmits, to the management server 10, a change request for changing the connection destination including the information of the IoT server 20B to which the connection destination has been changed and the communication apparatus ID of the communication apparatus 100.

In step S1003, when the receiving unit 312 of the management server 10 receives the change request, the second generating unit 318 of the FW providing unit 316B corresponding to the connection destination (the IoT server 20B) included in the change request, generates the second connection information B. For example, the second generating unit 318 generates the second connection information B including the URL of the IoT server 20B, the edge ID identifying the communication apparatus 100 serving as the edge in the IoT server 20B, the device certificate of the communication apparatus 100, and the like. The second generating unit 318 stores the generated second connection information B in the storage unit 319 of the FW providing unit 316B in association with the communication apparatus ID of the communication apparatus 100. The FW providing unit 316B may request the IoT server 20B to create the second connection information B as described above. In this case, the FW providing unit 316B stores the second connection information B generated by the IoT server 20B in the storage unit 319 or the like of the FW providing unit 316B in association with the communication apparatus ID of the communication apparatus 100.

In step S1004, the apparatus information managing unit 314 of the management server 10 updates the apparatus management DB 315. For example, in the apparatus information 400d as illustrated in FIG. 4D stored in the apparatus management DB 315, the item of "IoT server" is updated to "IoT server 20B", and the item of "edge ID" is updated to the edge ID included in the second connection information B. The apparatus information managing unit 314 also updates the item of "state" to "second connection information issued".

In step S1005, the FW providing unit 316A corresponding to the IoT server 20A of the management server 10 invalidates the second connection information A for the communication apparatus 100.

In step S1006, the FW providing unit 316A may add that the second connection information A is invalid in the "state" item of the apparatus information of the communication apparatus 100.

In step S1007, the FW providing unit 316B of the management server 10 instructs the communication apparatus 100 to acquire the second connection information B and the second FWB.

In step S1008, the device managing unit 303 of the communication apparatus 100 stops transmission of IoT data to the IoT server 20A.

In step S1009, the acquiring unit 302 of the communication apparatus 100 requests the management server 10 to acquire the second connection information B and the second FWB.

In step S1010, the apparatus information managing unit 314 of the management server 10 updates the item of "state" of the apparatus information of the communication apparatus 100 stored in the apparatus management DB 315 to "second connection information B reported".

In step S1011, the FW providing unit 316B of the management server 10 transmits, to the communication apparatus 100, the second connection information B corresponding to the communication apparatus ID of the communication apparatus 100 stored in the storage unit 319 and the second FWB for connecting to the IoT server 20B.

In step S1012, the acquiring unit 302 of the communication apparatus 100 overwrites the second FWB received from the management server 10 and the second connection information B in the storage unit 304.

In step S1013, the communication apparatus 100 is reactivated by the second FWB stored in the storage unit 304.

In step S1014, when the communication apparatus 100 is reactivated by the second FWB, the communication apparatus 100 connects to the IoT server 20B that is the connection destination by using the second connection information B.

In step S1015, the apparatus information managing unit 322 of the IoT server 20B performs authentication processing of the communication apparatus 100 based on the second connection information B received from the communication apparatus 100. Here, the communication apparatus 100 has the legitimate second connection information B issued by the management server 10, and, therefore, the apparatus information managing unit 322 permits connection by the communication apparatus 100.

In step S1016, the apparatus information managing unit 322 of the IoT server 20B updates the item of "state" of the apparatus information of the communication apparatus 100 stored in the apparatus management DB 315 to "second connection information B connected".

According to the above process, the communication apparatus 100 is communicatively connected to the IoT server 20B, and various processes can be executed.

(Connection Destination Changing Processing 2)

Figure 11:
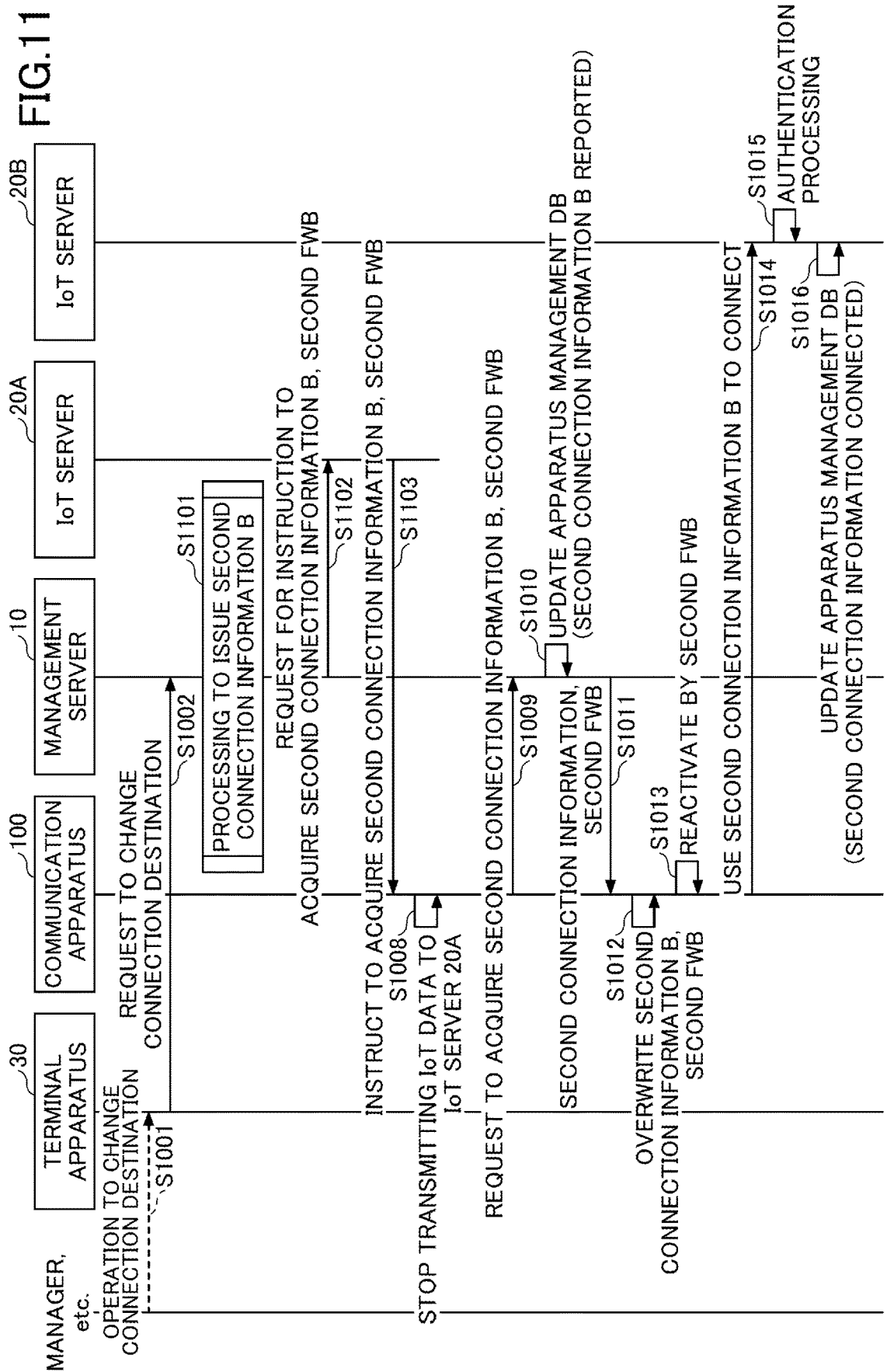
FIG. 11 is a sequence diagram (2) illustrating an example of processing for changing the connection destination according to the first embodiment.

FIG. 11 is a sequence diagram (2) illustrating an example of connection destination changing processing according to the first embodiment. This processing illustrates another example of processing in which the communication apparatus 100 communicates with the management server based on an instruction from outside such as that from the management server 10 or the IoT server 20A to reacquire the second FW 307 for connecting to another IoT server 20B.

Of the processing illustrated in FIG. 11, the processing in steps S1001, S1002, and S1008 to S1016 are similar to the processing in steps S1001, S1002, and S1008 to S1016 in FIG. 10, so the differences from the processing in FIG. 10 will be described here.

In step S1101, the management server 10 executes the processing of issuing the second connection information B as illustrated in steps S1003 to S1006 in FIG. 10.

In step S1102, the FW providing unit 316B of the management server 10 requests the IoT server 20A to which the communication apparatus 100 is connected, to instruct the communication apparatus 100 to acquire the second connection information B and the second FWB.

In step S1103, the transmitting/receiving unit 321 of the IoT server 20A instructs the communication apparatus 100 to acquire the second connection information B and the second FWB.

Thus, the FW providing unit 316B of the management server 10 may instruct the communication apparatus 100 to acquire the second connection information B and the second FWB by using the IoT server 20A to which the communication apparatus 100 is connected.

(Connection Destination Changing Processing 3)

Figure 12:
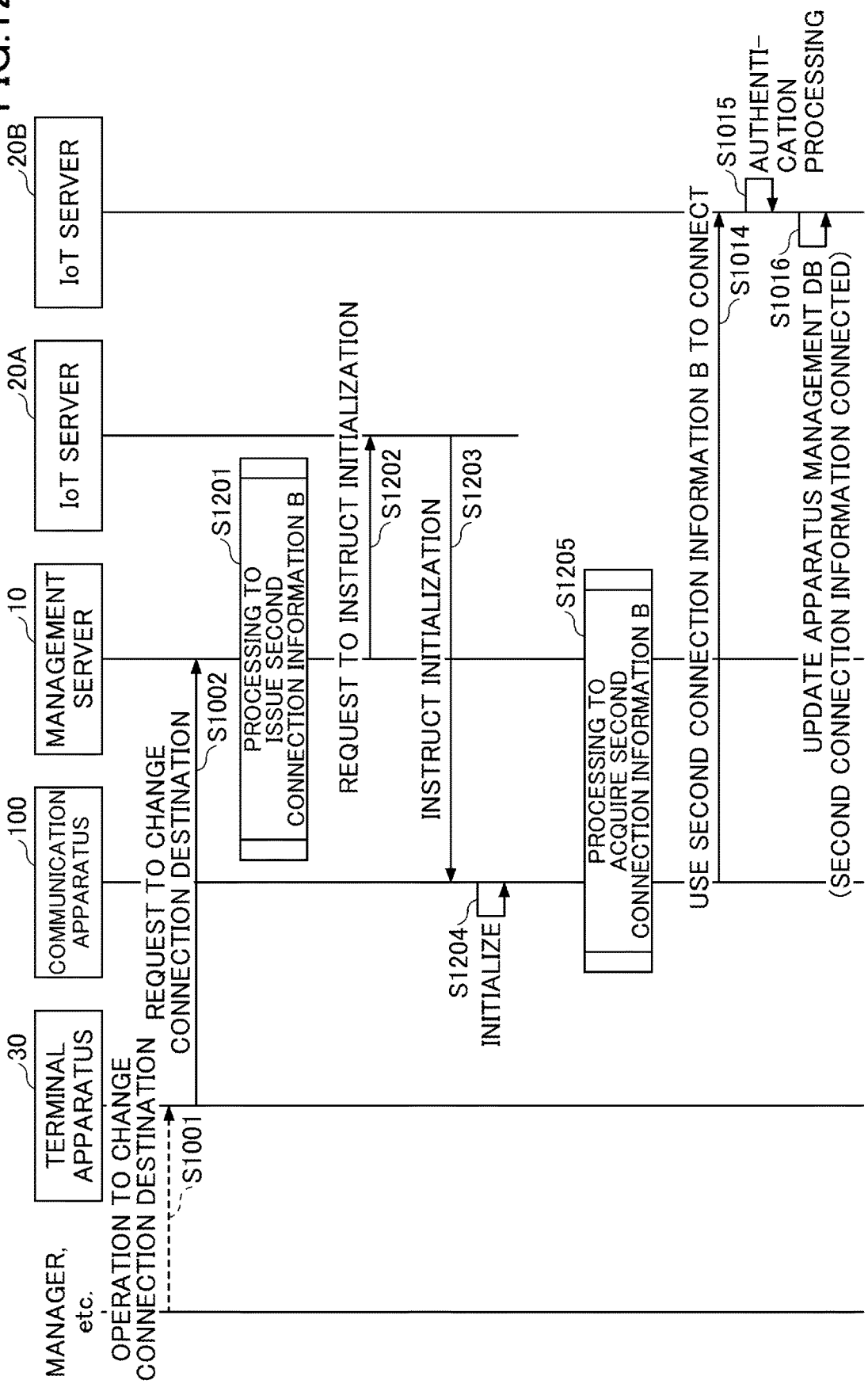
FIG. 12 is a sequence diagram (3) illustrating an example of processing for changing the connection destination according to the first embodiment.

FIG. 12 is a sequence diagram (3) illustrating an example of connection destination changing processing according to the first embodiment. This processing illustrates another example of processing when a manager or the like changes the IoT server 20 that is the connection destination to be connected to the installed communication apparatus 100. Of the processing illustrated in FIG. 11, the processing in steps S1001, S1002, S1014, and S1015 is similar to the processing in steps S1001, S1002, S1014, and S1015 in FIG. 10, and, therefore, the difference from the processing in FIG. 10 will be mainly described here.

In step S1201, the management server 10 executes the processing of issuing the second connection information B as illustrated in steps S1003 to S1006 in FIG. 10.

In step S1202, the FW providing unit 316B of the management server 10 requests the IoT server 20A to which the communication apparatus 100 is connected, to instruct the communication apparatus 100 to perform initialization.

In step S1203, the transmitting/receiving unit 321 of the IoT server 20A instructs the communication apparatus 100 to perform initialization.

In step S1204, the communication apparatus 100 performs initialization. For example, the communication apparatus 100 deletes the second FWA and the second connection information A stored in the storage unit 304 and is reactivated by the first FW 305.

In step S1205, the communication apparatus 100 and the management server 10 execute second connection information acquiring processing, for example, as illustrated in steps S613 to S617 of FIG. 6, and is reactivated by the second FWB.

(Processing at the Time of Discontinuance 1)

Figure 13:
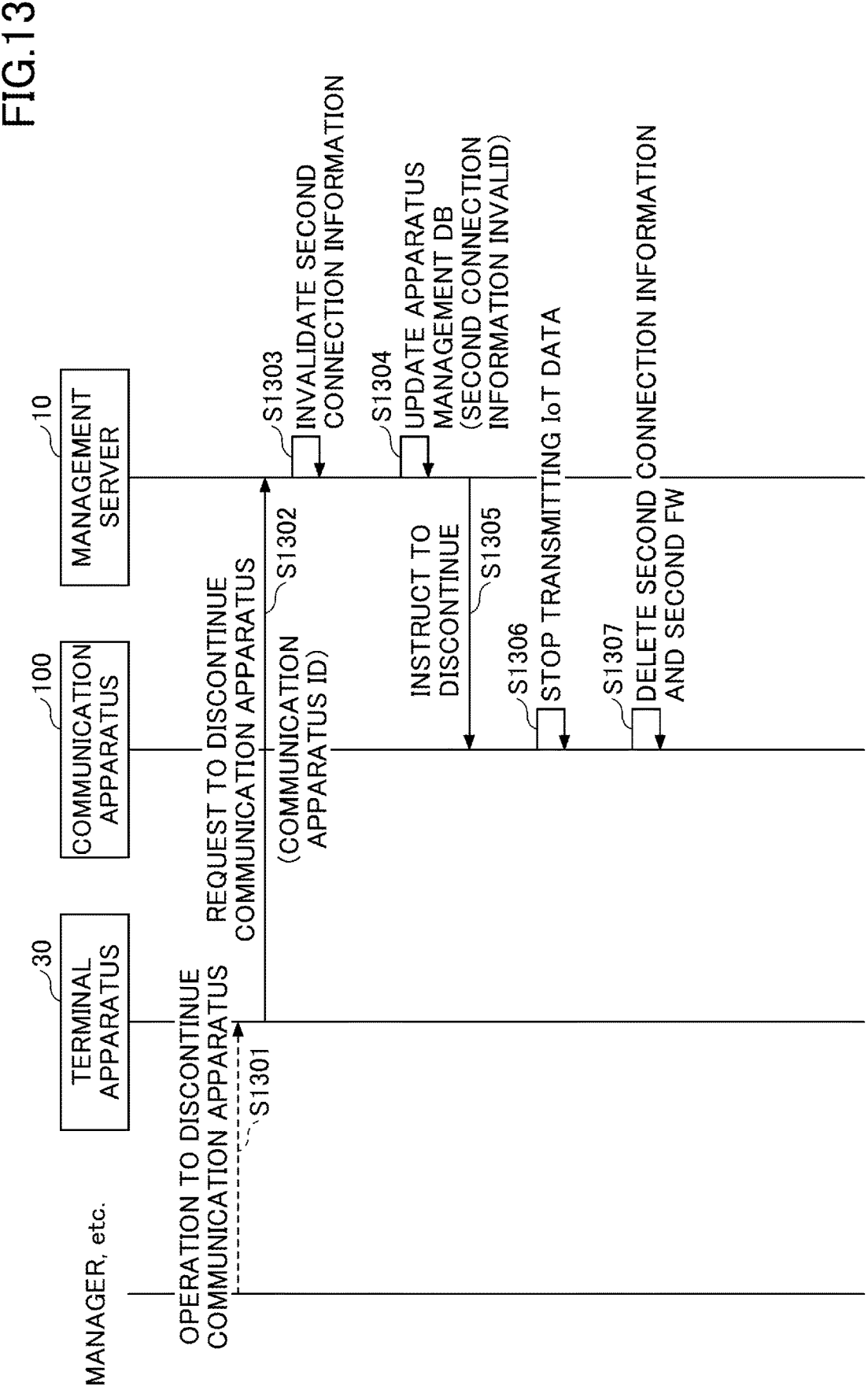
FIG. 13 is a sequence diagram (1) illustrating an example of processing at the time of discontinuance according to the first embodiment.

FIG. 13 is a sequence diagram (1) illustrating an example of processing at the time of discontinuance according to the first embodiment. This processing illustrates an example of a processing when discontinuing the installed communication apparatus 100. At the start of the processing illustrated in FIG. 13, it is assumed that the terminal apparatus 30 is displaying a setting screen for receiving a discontinuance operation of discontinuing the communication apparatus 100, for example, by the same procedures as in steps S802 to S804 of FIG. 8.

In step S1301, the manager or the like performs a discontinuance operation of discontinuing the communication apparatus 100 on the setting screen displayed by the terminal apparatus 30.

In step S1302, when the terminal apparatus receives the discontinuance operation of discontinuing the communication apparatus 100 by the manager or the like, the terminal apparatus 30 transmits, to the management server 10, a discontinuance request to discontinue the communication apparatus including the communication apparatus ID of the communication apparatus 100 to be discontinued.

When the receiving unit 312 of the management server 10 receives the discontinuance request to discontinue the communication apparatus 100 in step S1303, the apparatus information managing unit 314 of the management server 10 invalidates the second connection information 308 corresponding to the communication apparatus 100.

In step S1304, the apparatus information managing unit 314 of the management server 10 sets the "state" item of the apparatus information of the communication apparatus 100 stored in the apparatus management DB 315 to "second connection information invalid" (or "discontinued").

In step S1305, the apparatus information managing unit 314 of the management server 10 transmits a discontinuance instruction to the communication apparatus 100.

In step S1306, the device managing unit 303 of the communication apparatus 100 stops transmission of IoT data.

In step S1307, the communication apparatus 100 deletes the second FW 307 and the second connection information 308 stored in the storage unit 304.

By the above process, the manager or the like can execute the discontinuance processing of discontinuing the communication apparatus 100 by remote operation.

(Processing at the Time of Discontinuance 2)

Figure 14:
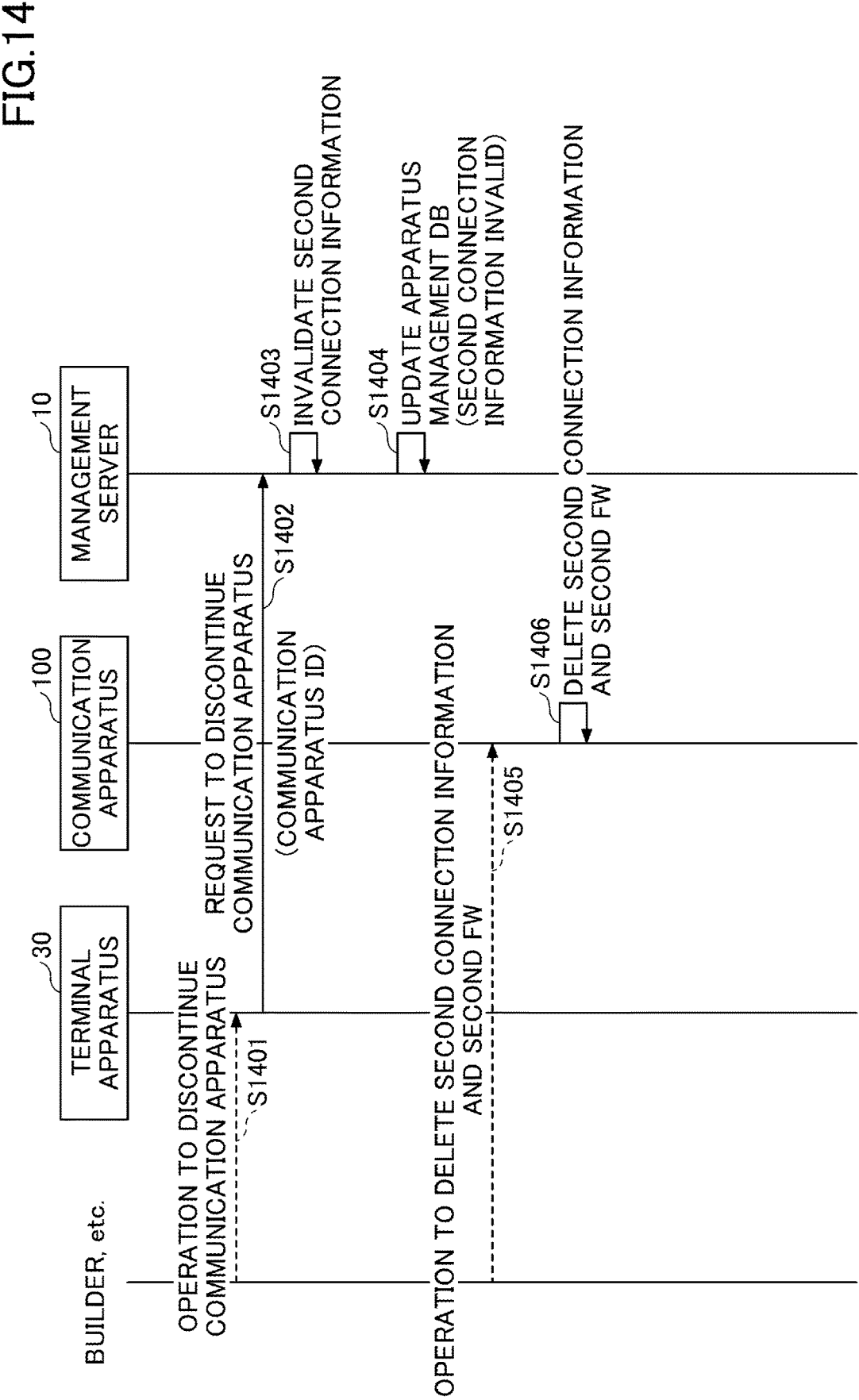
FIG. 14 is a sequence diagram (2) illustrating an example of processing at the time of discontinuance according to the first embodiment.

FIG. 14 is a sequence diagram (2) illustrating an example of processing at the time of discontinuance according to the first embodiment. This processing illustrates another example of a processing when discontinuing the installed communication apparatus 100. At the start of the processing illustrated in FIG. 14, it is assumed that the terminal apparatus 30 is displaying a setting screen for receiving a discontinuance operation of discontinuing the communication apparatus 100, for example, in the same procedures as in steps S802 to S804 of FIG. 8.

In step S1401, the builder, etc., performs the discontinuance operation for discontinuing the communication apparatus 100 on the setting screen displayed by the terminal apparatus 30.

In step S1402, when the terminal apparatus receives the discontinuance operation of discontinuing the communication apparatus 100 by the operator or the like, the terminal apparatus 30 transmits, to the management server 10, a discontinuance request of discontinuing the communication apparatus including the communication apparatus ID of the communication apparatus 100 to be discontinued.

When the receiving unit 312 of the management server 10 receives the discontinuance request of discontinuing the communication apparatus 100 in step S1403, the apparatus information managing unit 314 of the management server 10 invalidates the second connection information 308 corresponding to the communication apparatus 100.

In step S1404, the apparatus information managing unit 314 of the management server 10 sets the "state" item of the apparatus information of the communication apparatus 100 stored in the apparatus management DB 315 to "second connection information invalid" (or "discontinued").

In step S1405, the builder, etc., performs a deletion operation of deleting the second connection information 308 and the second FW 307 with respect to the communication apparatus 100.

In step S1406, the communication apparatus 100 deletes the second FW 307 and the second connection information 308 stored in the storage unit 304.

As described above, it is desirable that the discontinuance processing of discontinuing the communication apparatus 100 can be carried out by the builder or the like at the place where the communication apparatus 100 is installed.

Second Embodiment

In the first embodiment, an example in which the number of the IoT servers 20 to which the communication apparatus 100 transmits IoT data is one has been described, but the number of IoT servers to which the communication apparatus 100 transmits IoT data may be a plurality.

In the second embodiment, an example of processing in which the communication apparatus 100 transmits IoT data to two IoT servers 20 will be described. The system configuration, hardware configuration, and functional configuration of the communication system 1 according to the second embodiment may be the same as that of the first embodiment.

(Processing at the Time of Installation of the Communication Apparatus)

Figure 15:
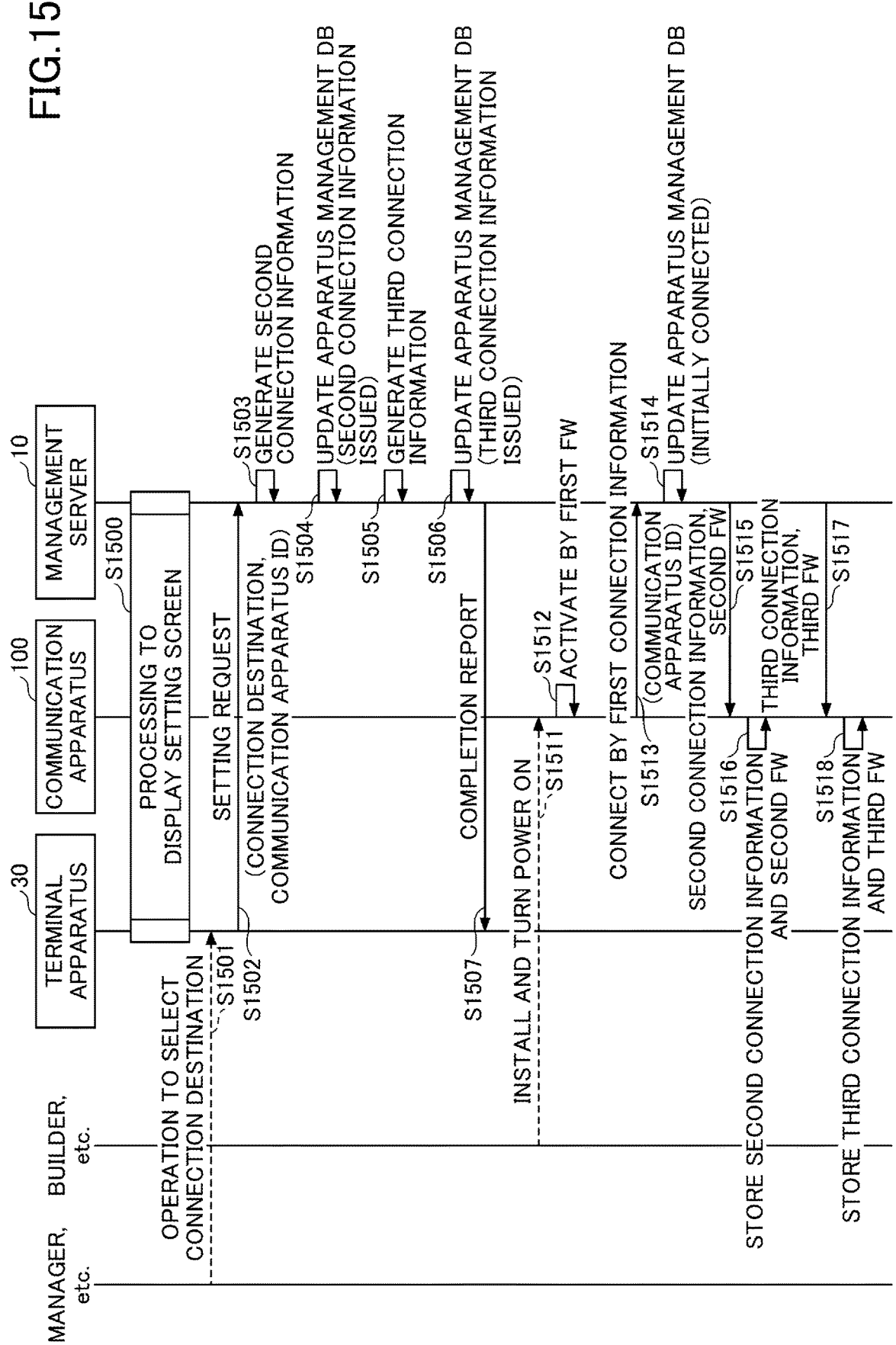
FIG. 15 is a sequence diagram illustrating an example of processing when installing the communication apparatus according to a second embodiment.

FIG. 15 is a sequence diagram illustrating an example of processing at the time of installation of the communication apparatus according to the second embodiment. This processing illustrates an example of processing for making a setting to install, at a predetermined location, the communication apparatus 100, in which the first FW 305 and the first connection information 306 are stored in the storage unit 304 by the processing illustrated in FIG. 5, to be connected to the IoT server 20A and the IoT server 20B.

In step S1500, the communication system 1 executes the display processing of the setting screen described in steps S601 to S604 of FIG. 6, and displays, for example, the setting screen 700A illustrated in FIG. 7A on the terminal apparatus 30.

In step S1501, the manager or the like performs the selection operation of selecting the connection destination on, for example, the setting screen 700A illustrated in FIG. 7A. Here, for example, it is assumed that the manager or the like selects the selection button 701A for selecting the "IoT server 20A" and the selection button 701B for selecting the "IoT server 20B" on the setting screen 700A, as described below.

In step S1502, when the terminal apparatus receives the connection destination selection operation by the manager or the like, the terminal apparatus 30 transmits, to the management server 10, a setting request including the information of the selected connection destination (the IoT server 20A and the IoT server 20B) and the communication apparatus ID identifying the communication apparatus 100.

In step S1503, when the receiving unit 312 of the management server 10 receives the setting request, the second generating unit 318 of the FW providing unit 316A corresponding to the IoT server 20A generates the second connection information in accordance with the setting request. For example, the second generating unit 318 of the FW providing unit 316A generates the second connection information including the URL of the IoT server 20A, the edge ID identifying the communication apparatus 100 serving as the edge in the IoT server 20A, and the authentication information of the communication apparatus 100. The second generating unit 318 of the FW providing unit 316A stores the generated second connection information in the storage unit 319 or the like in association with the communication apparatus ID of the communication apparatus 100.

In step S1504, the apparatus information managing unit 314 of the management server 10 updates the apparatus management DB 315. For example, the apparatus information managing unit 314 stores the information of the IoT server 20A in the item "IoT server" of the apparatus information 400a of the communication apparatus 100, the generated edge ID in the item "edge ID", and "second connection information issued" indicating the state in the item "state" as illustrated in FIG. 4A.

In step S1505, the second generating unit 318 of the FW providing unit 316B corresponding to the IoT server 20B generates the third connection information according to the setting information. For example, the second generating unit 318 of the FW providing unit 316B generates the third connection information including the URL of the IoT server 20B, the edge ID identifying the communication apparatus 100 serving as the edge in the IoT server 20B, the authentication information of the communication apparatus 100, and the like. The second generating unit 318 of the FW providing unit 316B stores the generated third connection information in the storage unit 319 and the like in association with the communication apparatus ID of the communication apparatus 100.

In step S1506, the apparatus information managing unit 314 of the management server 10 updates the apparatus management DB 315. For example, the apparatus information managing unit 314 updates the items of "IoT server", "edge ID", and "state" in the apparatus information 400a of the communication apparatus 100 as illustrated in FIG. 4B. Specifically, the apparatus information managing unit 314 adds the information of the IoT server 20B that is the connection destination to the item "IoT server", adds the edge ID generated by the second generating unit 318 to the item "edge ID", and adds "third connection information issued" indicating the state to the item "state".

In step S1507, the transmitting/receiving unit 311 of the management server 10 transmits a completion report indicating that the setting has been completed to the terminal apparatus 30 that is the request source.

When the builder, etc., installs the communication apparatus 100 and turns on the power of the communication apparatus 100 at any timing after executing the processing in steps S1501 to S1507 (step S1511), the communication system 1 executes the processing in step S1512 and thereafter.

In step S1512, the communication apparatus 100 is activated by the first FW 305 previously stored in the storage unit 304. In step S1513, the communication control unit 301 of the communication apparatus 100 connects to the management server 10 by using the first connection information 306 previously stored in the storage unit 304. At this time, the communication control unit 301 of the communication apparatus 100 transmits a communication apparatus ID identifying the communication apparatus 100 to the management server 10.

In step S1514, the apparatus information managing unit 314 of the management server 10 updates the apparatus management DB 315. For example, the apparatus information managing unit 314 updates the item "state" corresponding to the apparatus ID of the communication apparatus to "initially connected" in the apparatus information 400 stored in the apparatus management DB 315.

In step S1515, the FW providing unit 316A of the management server 10 transmits, to the communication apparatus 100, the second connection information 308 corresponding to the communication apparatus ID of the communication apparatus 100 stored in the storage unit 319 and the second FW 307 for connecting to the IoT server 20A.

In step S1516, the acquiring unit 302 of the communication apparatus 100 stores, in the storage unit 304, the second FW 307 and the second connection information 308 received from the management server 10.

In step S1517, the FW providing unit 316B of the management server 10 transmits, to the communication apparatus 100, the third connection information corresponding to the communication apparatus ID of the communication apparatus 100 and the third FW (firmware) for connecting to the IoT server 20B stored in the storage unit 319.

In step S1518, the acquiring unit 302 of the communication apparatus 100 stores, in the storage unit 304, the third FW and the third connection information received from the management server 10. For example, the acquiring unit 302 may overwrite the first FW 305 stored in the storage unit 304 with the third FW received from the management server 10.

(Processing when Collecting Data)

FIG. 16 is a sequence diagram illustrating an example of processing when collecting data according to the second embodiment. This processing illustrates an example of processing when collecting data executed by the communication system 1 after executing the processing of installing the communication apparatus described in FIG. 15.

In step S1601, the communication apparatus 100 connects to the IoT server 20A that is the connection destination by using, for example, the second connection information 308 and the second FW 307 stored in the storage unit 304.

In step S1602, the apparatus information managing unit 322 of the IoT server 20A performs authentication processing of authenticating the communication apparatus 100 based on the second connection information 308 received from the communication apparatus 100. For example, the apparatus information managing unit 322 verifies whether the authentication information (for example, a device certificate) included in the second connection information is legitimate authentication information. Here, the communication apparatus 100 has legitimate second connection information 308 issued by the management server 10, and, therefore, the apparatus information managing unit 322 permits connection by the communication apparatus 100.

In step S1603, the apparatus information managing unit 322 of the IoT server 20A updates the apparatus management DB 324. For example, the apparatus information managing unit 322 updates the "state" of the communication apparatus 100 stored in the apparatus management DB 324 of the IoT server 20A to "second connection information connected". As described above, the apparatus information managing unit 322 may update the apparatus information 400 stored in the apparatus management DB 315 of the management server 10 by using a web API or the like provided by the receiving unit 312 of the management server 10.

By the processing in steps S1601 to S1603, the communication apparatus 100 can transmit, to the IoT server 20A, IoT data including data received from the devices 101A, 101B, 101C, and so forth in steps S1604 and S1605.

In step S1611, the communication apparatus 100 connects to the IoT server 20B that is the connection destination by using, for example, the third connection information and the third FW stored in the storage unit 304.

In step S1612, the apparatus information managing unit 322 of the IoT server 20B performs authentication processing of authenticating the communication apparatus 100 based on the third connection information received from the communication apparatus 100. For example, the apparatus information managing unit 322 verifies whether the authentication information included in the third connection information is legitimate authentication information. Here, the communication apparatus 100 has legitimate third connection information issued by the management server 10, and, therefore, the apparatus information managing unit 322 permits connection by the communication apparatus 100.

In step S1613, the apparatus information managing unit 322 of the IoT server 20B updates the apparatus management DB 324. For example, the apparatus information managing unit 322 updates the "state" of the communication apparatus 100 stored in the apparatus management DB 324 of the IoT server 20B to "third connection information connected". As described above, the apparatus information managing unit 322 may update the apparatus information 400 stored in the apparatus management DB 315 of the management server 10 by using a web API or the like provided by the receiving unit 312 of the management server 10.

By the processing in steps S1611 to S1613, the communication apparatus 100 can transmit, to the IoT server 20A, IoT data including data received from the devices 101A, 101B, 101C, and so forth in step S1614.

For example, the communication apparatus 100 can transmit IoT data to the IoT server 20A and the IoT server 20B by alternately repeating the execution of the first connection processing illustrated in steps S1601 to S1603 and the processing of steps S1611 to S1613.

Modified Example

As a modified example, the communication system 1 may use the second FW and the third FW as common firmware, and manage, by the connection information, information such as the type of data collected by the device managing unit 303, the timing of transmitting IoT data, and the format of IoT data. For example, in step 81503 of FIG. 15, the second generating unit 318 of the FW providing unit 316A may generate the second connection information including the type of data to be collected, the timing of transmitting data, the format, etc., in addition to the URL, edge ID, and authentication information for the IoT server A. Similarly, in step 1505 of FIG. 15, the second generating unit 318 of the FW providing unit 316B may generate the third connection information including the type of data to be collected, the timing of transmitting data, the format, etc., in addition to the URL, edge ID, and authentication information for the IoT server B.

In this case, the communication apparatus 100 can connect to the IoT server 20A by using the common firmware and the second connection information in step S1601, and transmit IoT data to the IoT server 20A in accordance with the second connection information in step S1605. Similarly, the communication apparatus 100 can connect to the IoT server 20B by using the common firmware and the third connection information in step S1611, and transmit IoT data to the IoT server 20B in accordance with the third connection information in step S1614.

Thus, according to the second embodiment, the communication apparatus 100 can transmit IoT data collected from the devices 101A, 101B, 101C, and so on, etc., to the plurality of IoT servers 20.

According to the above embodiments, the communication apparatus communicating with the server based on connection information and firmware for connecting to the server, can appropriately communicate with various other servers.

Although the above embodiments have been described, it will be understood that various changes in form and details can be made without departing from the purpose and scope of the claims.

The present international application is based upon and claims priority to Japanese Patent Application No. 2021-078393 filed on May 6, 2021, the entire contents of which are incorporated herein by reference.

REFERENCE SIGNS LIST 1 communication system
10 management server (first server)
20, 20A, 20B IoT server (second server)
100 communication apparatus
305 first FW (first firmware)
306 first connection information
307 second FW (second firmware)
308 second connection information
315 apparatus management DB
319 storage unit
400, 400a to 400e apparatus information

The invention claimed is:

1. A server that is a first server configured to
receive a selection of a service to be used by a communication apparatus or a selection of a second server, the service being provided by the second server,
update, in response to receiving the selection of the second server, a memory or a storage that stores pieces of information of a plurality of second servers to which communication apparatuses are to be coupled, in association with pieces of apparatus identification information identifying the communication apparatuses,
after the updating, receive a request from the communication apparatus, the request including first connection information including apparatus identification information identifying the communication apparatus,
identify a given second server, among the plurality of second servers, corresponding to the apparatus identification information included in the first connection information, based on an association between the pieces of apparatus identification information and the pieces of information of the plurality of second servers in the memory or the storage,
determine the given second server as the second server to which the communication apparatus is to be coupled, and
transmit, to the communication apparatus, second firmware for coupling to the second server providing the service to the communication apparatus.

2. The server according to claim 1, wherein
the first server stores second connection information and the second firmware for coupling to the second server, and
the first server is configured to transmit, to the communication apparatus, the second connection information and the second firmware for coupling to the second server providing the service to the communication apparatus.

3. The server according to claim 2, wherein
the second connection information includes authentication information for coupling to the second server, and
the first server is configured to generate the authentication information for coupling to the second server.

4. A server that is a first server configured to
receive a selection of a service to be used by a communication apparatus or a selection of a second server, the service being provided by the second server,
store, in response to receiving the selection of the service to be used by the communication apparatus, the service in a memory or a storage, for each piece of apparatus identification information identifying the communication apparatus,
after storing the service, receive a request from the communication apparatus, the request including first connection information including the apparatus identification information identifying the communication apparatus,
identify a given second server, among a plurality of second servers, corresponding to the apparatus identification information included in the first connection information,
determine the given second server as the second server to which the communication apparatus is to be coupled, based on the service, and
transmit, to the communication apparatus, second firmware for coupling to the second server providing the service to the communication apparatus.

5. A communication system comprising:
a first server; and
a communication apparatus, wherein
the first server is configured to
receive a selection of a service to be used by the communication apparatus or a selection of a second server, the service being provided by the second server,
update, in response to receiving the selection of the second server, a memory or a storage that stores pieces of information of a plurality of second servers to which communication apparatuses are to be coupled, in association with pieces of apparatus identification information identifying the communication apparatuses,
after the updating, receive a request from the communication apparatus, the request including first connection information including the apparatus identification information identifying the communication apparatus,
identify a given second server, among the plurality of second servers, corresponding to the apparatus identification information included in the first connection information, based on an association between the pieces of apparatus identification information and the pieces of information of the plurality of second servers in the memory or the storage,
determine the given second server as the second server to which the communication apparatus is to be coupled, and
transmit, to the communication apparatus, second firmware for coupling to the second server providing the service to the communication apparatus, and wherein
the communication apparatus is configured to
communicate with the first server based on the first connection information and first firmware for coupling to the first server, and
acquire, from the first server, the second firmware for coupling to the second server that is different from the first server.

6. A communication method in a communication system including a first server and a communication apparatus, the communication method comprising:
receiving, by the first server, a selection of a service to be used by the communication apparatus or a selection of a second server, the service being provided by the second service;
in response to receiving the selection of the second server, updating-storing, by the first server, a memory or a storage that stores pieces of information of a plurality of second servers to which communication apparatuses are to be coupled, in association with pieces of apparatus identification information identifying the communication apparatuses;
communicating, by the communication apparatus, with the first server based on first connection information and first firmware for coupling to the first server;
receiving, by the first server, a request from the communication apparatus, the request including the first connection information that includes apparatus identification information identifying the communication apparatus;
identifying, by the first server, a given second server, among the plurality of second servers, corresponding to the apparatus identification information included in the first connection information, based on an association between the pieces of apparatus identification information and the pieces of information of the plurality of second servers in the memory or the storage;
determining, by the first server, the given second server as the second server to which the communication apparatus is to be coupled;
transmitting, by the first server to the communication apparatus, second firmware for coupling to the second server providing the service to the communication apparatus; and
acquiring, by the communication apparatus from the first server, the second firmware for coupling to the second server that is different from the first server.

7. A communication system comprising:
a first server; and
a communication apparatus, wherein
the first server is configured to
receive a selection of a service to be used by the communication apparatus or a selection of a second server, the service being provided by the second server,
store, in response to receiving the selection of the service to be used by the communication apparatus, the service in a memory or a storage, for each piece of apparatus identification information identifying the communication apparatus,
after storing the service, receive a request from the communication apparatus, the request including first connection information including the apparatus identification information identifying the communication apparatus,
identify a given second server, among a plurality of second servers, corresponding to the apparatus identification information included in the first connection information,
determine the given second server as the second server to which the communication apparatus is to be coupled, based on the service, and
transmit, to the communication apparatus, second firmware for coupling to the second server providing the service to the communication apparatus, and wherein
the communication apparatus is configured to
communicate with the first server based on the first connection information and first firmware for coupling to the first server, and
acquire, from the first server, the second firmware for coupling to the second server that is different from the first server.

8. A communication method in a communication system including a first server and a communication apparatus, the communication method comprising:
receiving, by the first server, a selection of a service to be used by the communication apparatus or a selection of a second server, the service being provided by the second server;
in response to receiving the selection of the service to be used by the communication apparatus, storing, by the first server, the service to be used by the communication apparatus, for each piece of apparatus identification information identifying the communication apparatus;
communicating, by the communication apparatus, with the first server based on first connection information and first firmware for coupling to the first server;
receiving, by the first server, a request from the communication apparatus, the request including the first connection information that includes the apparatus identification information identifying the communication apparatus;

identifying a given second server, among a plurality of second servers, corresponding to the apparatus identification information included in the first connection information;

determining, by the first server, the given second server as the second server to which the communication apparatus is to be coupled, based on the service;

transmitting, by the first server to the communication apparatus, second firmware for coupling to the second server providing the service to the communication apparatus; and acquiring, by the communication apparatus from the first server, the second firmware for coupling to the second server that is different from the first server.

\* \* \* \* \*